US008678913B2

(12) United States Patent
Lee et al.

(10) Patent No.: US 8,678,913 B2
(45) Date of Patent: Mar. 25, 2014

(54) GAMING SYSTEM AND METHOD OF PROVIDING AN ELECTRONIC GAME WITH A SCALING FACTOR

(75) Inventors: Arthur Lee, Las Vegas, NV (US); Scott Delekta, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

(21) Appl. No.: 13/471,697

(22) Filed: May 15, 2012

(65) Prior Publication Data

US 2013/0084940 A1 Apr. 4, 2013

Related U.S. Application Data

(60) Provisional application No. 61/541,297, filed on Sep. 30, 2011.

(30) Foreign Application Priority Data

Mar. 27, 2012 (AU) ................................ 2012201788

(51) Int. Cl.
*A63F 13/10* (2006.01)
*G07F 17/32* (2006.01)

(52) U.S. Cl.
USPC ................... 463/25; 463/17; 463/20; 463/26; 463/27

(58) Field of Classification Search
USPC ................................................ 463/17–28, 43
See application file for complete search history.

(56) References Cited

U.S. PATENT DOCUMENTS

| | | | | |
|---|---|---|---|---|
| 6,004,207 | A * | 12/1999 | Wilson et al. | 463/20 |
| 6,939,230 | B2 * | 9/2005 | Vancura | 463/25 |
| 7,927,208 | B2 * | 4/2011 | Vancura | 463/25 |
| 8,033,903 | B2 * | 10/2011 | Cregan | 463/16 |
| 8,272,941 | B2 * | 9/2012 | Acres | 463/20 |
| 2007/0167208 | A1 * | 7/2007 | Acres | 463/16 |
| 2008/0113779 | A1 * | 5/2008 | Cregan | 463/27 |
| 2009/0011826 | A1 * | 1/2009 | Acres | 463/27 |
| 2009/0181763 | A1 * | 7/2009 | Wong | 463/25 |
| 2010/0075733 | A1 | 3/2010 | Breslo | |

FOREIGN PATENT DOCUMENTS

WO 01/32280 A1 5/2001

OTHER PUBLICATIONS

Patent Examination Report No. 1 (AU 2012232942) date of issue Jun. 13, 2013.

* cited by examiner

*Primary Examiner* — Arthur O Hall
*Assistant Examiner* — Bach Hoang
(74) *Attorney, Agent, or Firm* — Howard & Howard Attorneys PLLC

(57) ABSTRACT

A gaming machine and method are provided which allow a player to play a gaming machine. The gaming machine and method allow a player to make a wager, display a first game on a display device, generate an outcome associated with the first game, and award the player an award for the first game based at least in part on the generated first game outcome. In addition, the gaming machine determines if a triggering condition occurred, displays a second game if the triggering condition has occurred, and calculates a current trigger cycle of the generated second game. The current trigger cycle is equal to a number of first games played after an occurrence of a previous second game triggering condition. The player is provided an award for the second game based at least in part on the second game current trigger cycle.

21 Claims, 19 Drawing Sheets

Mascot Gives an Initial Multiplier Boost

Clock Position After a Competed Bonus Feature

Mascot Gives Clock an Initial Boost.
Clock Hand Spins Round and Round

Clock Hands Finally Stops on an Initial Start Position.

Mascot Gives Clock Hand a BOOST of Bonus Time.

Clock Hands Increments by Bonus Time Amount.

Mascot Prompts Playcr to Look Up.

Mascot then BOOSTS Bonus Time Multiplier and Increases if to 5x

Once Clock Strikes 10, Special Anticipation Time Event is Started.

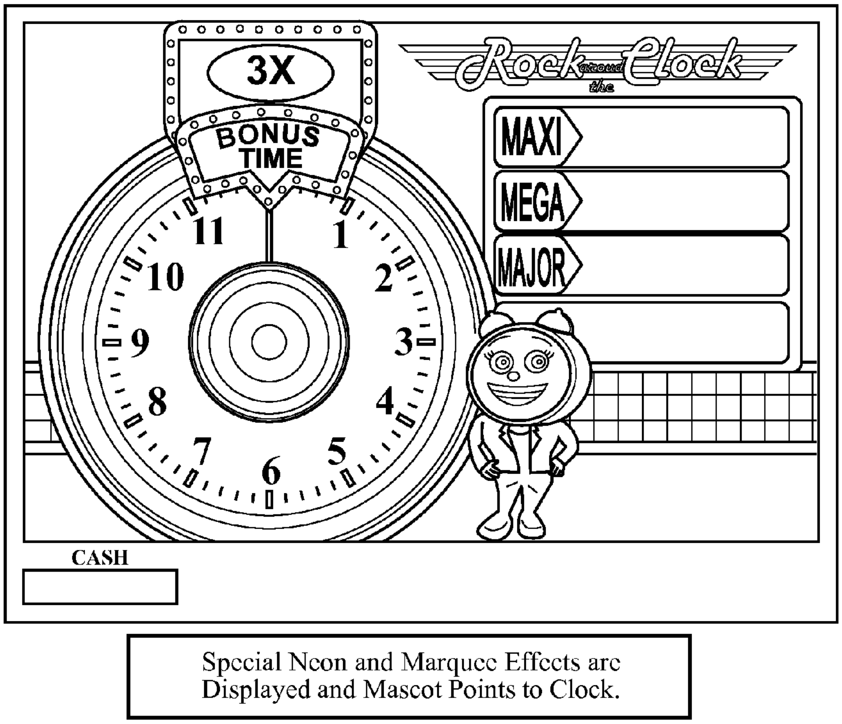
FIG. 13B
Special Neon and Marquee Effects are Displayed and Mascot Points to Clock.
FIG. 14
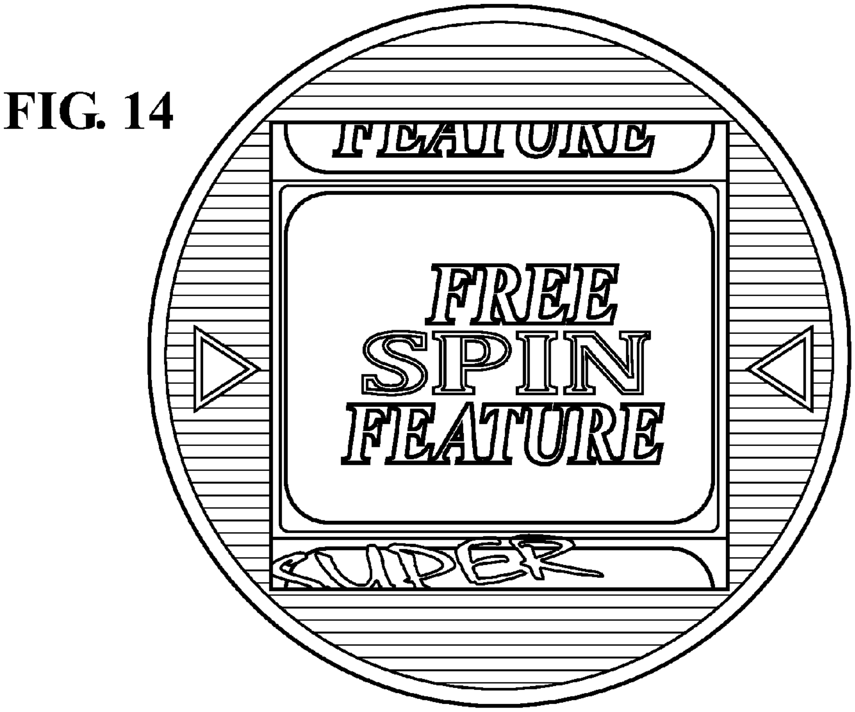

Clock Face Transforms to into a circular Slot Machine and Beings to Spin Vertically.

| | Final # Symbols Displayed | | |
|---|---|---|---|
| Init # of Symbols | 3 | 2 | 1 |
| 2 | 25% | | |
| 1 | 25% | 30% | |
| 0 | 50% | 70% | 100% |

Table 3 - Init Symbol Display Table

| | Final # Symbols Displayed on Reels 1 or 2 (Long Spin) | | |
|---|---|---|---|
| Init # of Symbols | 3 | 2 | 1 |
| 2 | 30% | 30% | |
| 1 | 70% | 70% | 100% |
| 0 | 0% | 0% | 0% |

Table 4 - Init Symbol Display Table for Long Spins (Reels 1 and 2)

| Combo # | REEL #1 | REEL #2 | REEL #3 | Total Ways | Mystery Nudge Change |
|---|---|---|---|---|---|
| 1 | 3 | 3 | 3 | 27 | 75% |
| 2 | 2 | 3 | 3 | 18 | 75% |
| 3 | 3 | 2 | 3 | 18 | 75% |
| 4 | 3 | 3 | 2 | 18 | 75% |
| 5 | 2 | 2 | 3 | 12 | 65% |
| 6 | 2 | 3 | 2 | 12 | 65% |
| 7 | 3 | 2 | 2 | 12 | 65% |
| 8 | 1 | 3 | 3 | 9 | 65% |
| 9 | 3 | 1 | 3 | 9 | 65% |
| 10 | 3 | 3 | 1 | 9 | 65% |
| 11 | 2 | 2 | 2 | 8 | 60% |
| 12 | 1 | 2 | 3 | 6 | 60% |
| 13 | 1 | 3 | 2 | 6 | 60% |
| 14 | 2 | 1 | 3 | 6 | 60% |
| 15 | 2 | 3 | 1 | 6 | 60% |
| 16 | 3 | 1 | 2 | 6 | 60% |
| 17 | 3 | 2 | 1 | 6 | 60% |
| 18 | 1 | 2 | 2 | 4 | 55% |
| 19 | 2 | 1 | 2 | 4 | 55% |
| 20 | 2 | 2 | 1 | 4 | 55% |
| 21 | 1 | 1 | 3 | 3 | 0% |
| 22 | 1 | 3 | 1 | 3 | 0% |
| 23 | 3 | 1 | 1 | 3 | 0% |
| 24 | 1 | 1 | 2 | 2 | 0% |
| 25 | 1 | 2 | 1 | 2 | 0% |
| 26 | 2 | 1 | 1 | 2 | 0% |
| 27 | 1 | 1 | 1 | 1 | 0% |

Table 1 - Mystery Nudge Chance Table

FIG. 17A

| Pattern # | REEL #1 | REEL #2 | REEL #3 | Weight | P(x) |
|---|---|---|---|---|---|
| 1 | N | - | - | 100 | 0.1111 |
| 2 | - | N | - | 100 | 0.1111 |
| 3 | - | - | N | 150 | 0.1667 |
| 4 | - | N | N | 150 | 0.1667 |
| 5 | N | N | - | 100 | 0.1111 |
| 6 | N | - | N | 100 | 0.1111 |
| 7 | N | N | N | 200 | 0.2222 |
| | | | | 900 | 1 |

Table 2 - Reel Nudge Table

FIG. 17B

FIG. 19A

| Animation | Description |
|---|---|
| FEgi_1001 | Mascot Idle Animation (LOOP) |
| FEgi_1001_new | New Mascot Idle Animation (+wink+kisses) |
| FEGA_0004 | Mascot Shrugs Shoulders. (When Player Hits Collect) |
| FEGA_0012 | Mascot Clap During Small Win <5x Bet Level |
| MASCOT_MEDIUM_WIN_CELEBRATION | Mascot Medium Win Celebration 5x-24x Bet Level |
| FEGA_0003 | Mascot Celebration for Large Win >=25x Bet Level |
| FEGA_0005 | Mascot Waves Goodbye to the Player (LOOP) |
| FEGA_0001 | Mascot Points to Bonus Won Meter |
| MASCOT_RACE_START_1 | Quick Race Flag Start Animation (1-4 CARS Appear on Reels) |
| MASCOT_RACE_START_2 | Longer More Elaborate Race Start Animation (5-9 CARS Appear on Reels)-http:www.youtube.com/watch?v=Kg0o_5ldy0w |

Table 5-Mascot Animations for Free Spin Game

FIG. 19B

| |
|---|
| Shakin' and Reelin' |
| Super Fortune Racer |
| JukeBox Riches |
| Super Shakin' and Reelin' |
| Fortune Racer |
| Golden JukeBox Riches |
| $$$ Mystery Credits |

Table 6- Reel Strip Layout

FIG. 20A

| Trigger Game Number | Weight | P(x) |
|---|---|---|
| 50 | 1 | 0.0099 |
| 51 | 1 | 0.0099 |
| 52 | 1 | 0.0099 |
| 53 | 1 | 0.0099 |
| . | 1 | 0.0099 |
| . | 1 | 0.0099 |
| . | 1 | 0.0099 |
| . | 1 | 0.0099 |
| 150 | 1 | 0.0099 |

Table 7- Sample Trigger Game Table

FIG. 20B

| LEFTMOST BUTTON | | | | RIGHTMOST BUTTON |
|---|---|---|---|---|
| 1 | 1 | 1 | 1 | 1 |
| 1 | 2 | 2 | 2 | 2 |
| 1 | 2 | 3 | 3 | 3 |
| 1 | 2 | 3 | 4 | 4 |
| 1 | 2 | 3 | 4 | 5 |
| 1 | 2 | 4 | 6 | 8 |
| 1 | 2 | 3 | 5 | 10 |
| 1 | 2 | 4 | 7 | 10 |

Table 8- Bet Level Options for the Advantage Revolution

FIG. 20C

| Spin # | Bet Level |
|---|---|
| 1 | 1 |
| 2 | 2 |
| 3 | 4 |
| 4 | 3 |
| 5 | 8 |
| 6 | 4 |
| 7 | 1 |
| 8 | 1 |
| 9 | 1 |
| 10 | 2 |
| | 2.70 |

Table 9- Bets Placed for 10 Consecutive Spins

FIG. 21A

| | 50 Credits (B1) |
|---|---|
| Base Game | 60% |
| Bonus Games | 28% |
| | 88% |

Table 10 Sample Payout Breakdown

FIG. 21B

| | 50 Credits (B1) |
|---|---|
| Base Game | 60% |
| Bonus Games | 20% |
| Mascot Boost (0.4x) | 8% |
| | 88% |

Table 11 Sample Payout Breakdown

FIG. 21C

| Boost Factor | Weight | EV |
|---|---|---|
| 4 | 1 | 0.061538 |
| 3 | 2 | 0.092308 |
| 2 | 4 | 0.123077 |
| 1 | 8 | 0.123077 |
| 0 | 50 | 0 |
| 0 | 0 | 0 |
| 0 | 0 | 0 |
| | 65 | 0.4 |

Table 12 Example of GetVolatilityScaleFactor() Function

FIG. 22A

| Boost Factor | Weight | EV |
|---|---|---|
| 50 | 10 | 0.046729 |
| 20 | 20 | 0.046729 |
| 10 | 40 | 0.037383 |
| 3 | 80 | 0.02243 |
| 2 | 320 | 0.059813 |
| 1 | 2000 | 0.186916 |
| 0 | 8230 | 0 |
| | 65 | 0.4 |

Table 13 Example of GetVolatilityScaleFactor2() Function

| Bought Game # | Mystery Multiplier Boost Trigger Cycle | Function |
|---|---|---|
| 1-49 | 2 | *GetVolatilityScaleFactor()* |
| 50+ | 10 | *GetVolatilityScaleFactor2()* |

Table 14 Mystery Multiplier Trigger Control Tables

FIG. 22B

GAMING SYSTEM AND METHOD OF PROVIDING AN ELECTRONIC GAME WITH A SCALING FACTOR

CROSS REFERENCE TO RELATED APPLICATION

This application claims priority to Australian Patent Application No. 2012201788, filed Mar. 27, 2012, and U.S. Provisional Patent Application Ser. No. 61/541,297, filed Sep. 30, 2011, the disclosures of which are hereby incorporated by reference in their entirety.

FIELD OF THE INVENTION

The present invention relates generally to video gaming machines and more particularly, to an apparatus and method for providing a video game with a scaling factor.

BACKGROUND OF THE INVENTION

Gaming machines, such as slot machines, are a cornerstone of the gaming industry. Generally, the popularity of such machines with players is dependent on the perceived likelihood of winning money at the particular game and the intrinsic entertainment value of the game relative to other available gaming options. Where the available gaming options include a number of competing games and the expectation of winning each game is believed to be generally the same, players are most likely to be attracted to the most entertaining and exciting games. Thus, gaming operators strive to employ the most entertaining and exciting games available because such games attract frequent play and, hence, increase profitability to the operator.

Furthermore, one concept that has been successfully employed to enhance the entertainment value of the game is the addition of a bonus game that may be played in conjunction with the "primary" game. The bonus game may comprise any type of game, either similar to or completely different from the primary game. The bonus game is initiated upon the occurrence of a selected event or outcome of the primary game.

Because the excitement and entertainment value of the primary game provides increased player appeal relative to other gaming machines and the bonus game concept increases player appeal and excitement, thereby increasing the chance to win the potential pay-out amount, there is a continuing need to develop new features for primary and bonus games. New features are necessary to appeal to player interest and enhance excitement in order to entice longer play and satisfy demands of operators for interesting games and increased profitability. The present invention is directed to satisfying these needs.

SUMMARY OF THE INVENTION

In one aspect of the present invention, a method of allowing a player to play a gaming machine is provided. The method includes the steps of allowing a player to make a wager, displaying a first game on a display device, generating an outcome associated with the first game, and awarding the player an award for the first game based at least in part on the generated first game outcome. In addition, the method includes determining if a triggering condition occurred, displaying a second game if the triggering condition has occurred, and calculating a current trigger cycle of the generated second game. The current trigger cycle is equal to a number of first games played after an occurrence of a previous second game triggering condition. The player is provided an award for the second game based at least in part on the second game current trigger cycle.

In another aspect, a gaming machine is provided. The gaming machine includes a display device, a user input device configured to generate a signal indicative of a player's selection input, and a controller coupled to the display device and the user input device. The controller is configured to display a first game on a display device, receive a signal indicative of a player's wager associated with the first game, generate an outcome associated with the first game, display the outcome on the display device, and award the player an award for the first game based at least in part on the generated first game outcome. In addition, the controller determines if a triggering condition occurred and displays a second game on the display device upon determining the triggering condition has occurred. The controller also calculates a current trigger cycle of the generated second game. The current trigger cycle is equal to a number of first games played after an occurrence of a previous second game triggering condition, and awards the player an award for the second game based at least in part on the second game current trigger cycle.

In yet another embodiment, a gaming system is provided. The gaming system includes a plurality of gaming machines and a jackpot controller that is coupled to each gaming machine. Each gaming machine includes a user selection input device, a first display device, and a game controller. The game controller is configured to allow an associated player to make a wager on a first game, randomly select an outcome of the first game, and award the associated player an award based at least in part on the first game outcome. The jackpot controller is configured to determine if a triggering condition occurred in a first game played on an associated gaming machine, and generate a second game on the associated gaming machine upon determining the triggering condition has occurred. In addition, the jackpot controller calculates a current trigger cycle of the generated second game. The current trigger cycle is equal to a number of first games played on the associated gaming machine after an occurrence of a previous second game triggering condition, and awards the player an award for the second game based at least in part on the second game current trigger cycle.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 7-15 are diagrammatic illustrations of an electronic game according to another embodiment of the present invention;

DETAILED DESCRIPTION OF THE PREFERRED EMBODIMENT

Figure 1:
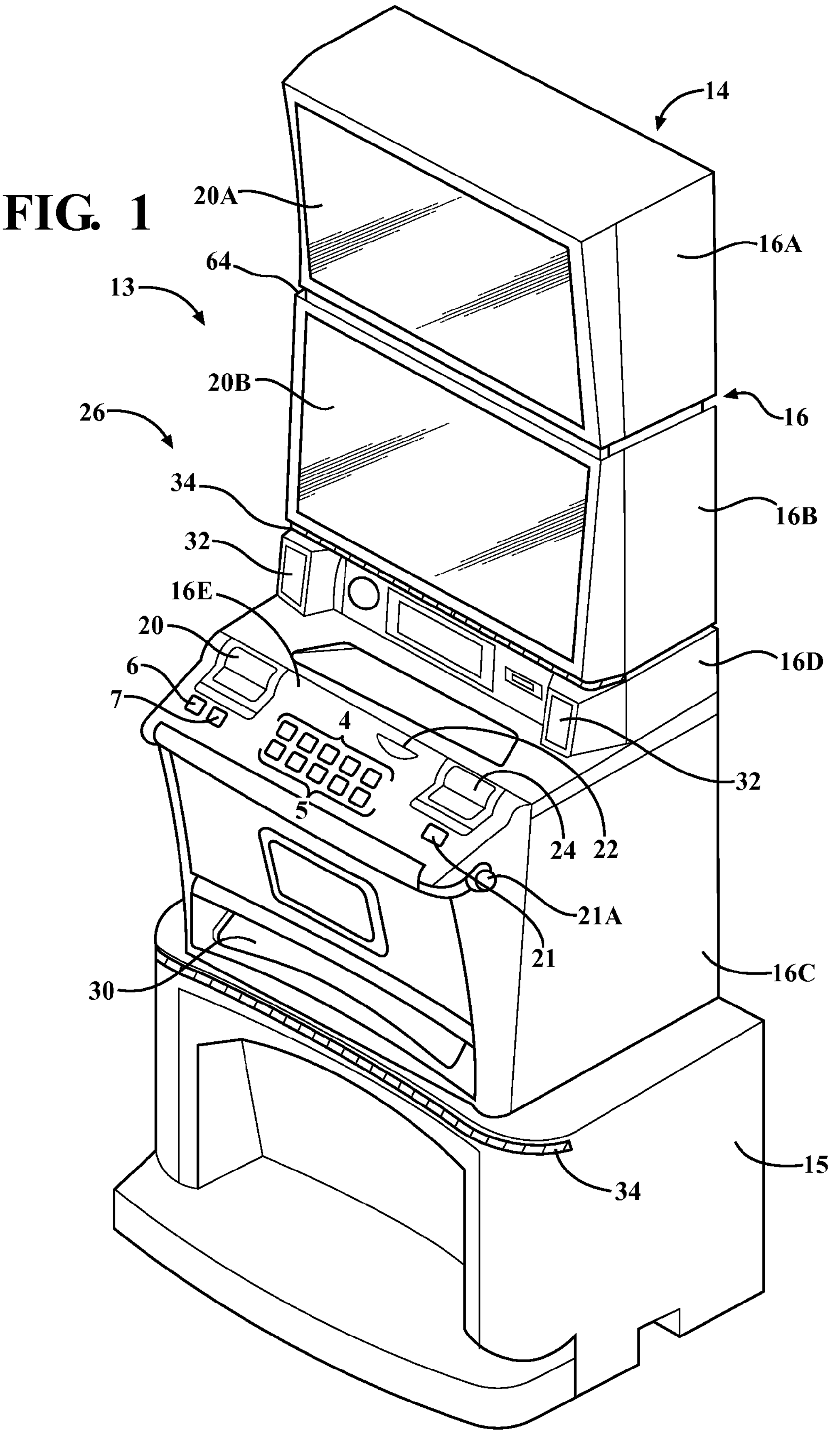
FIG. 1 is a perspective view of an exemplary gaming machine of the present invention.

With reference to the drawings and in operation, the embodiments described herein include a gaming machine and method that allows a player to initiate a gaming session, displays a first game, accepts a wager on the first game, generates an outcome of the first game, and awards the player an award if the first game outcome is a winning outcome. In addition, the gaming machine determines if a triggering condition has occurred in the first game, and displays a second game if the triggering condition has occurred. In addition, the gaming machine calculates a current trigger cycle of the second game, and provides the player an award for the second game based at least in part on the second game current trigger cycle. Moreover, the gaming machine calculates a scaling factor based at least in part on the current trigger cycle and an average trigger event cycle, calculates an average feature award associated with the calculated trigger event cycle based at least in part on a total average feature award and the scaling factor, and determines the second game award based at least in part on the calculated average feature award.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

An exemplary technical effect of the methods, systems, and computers described herein includes at least one of (a) allowing a player to make a wager, (b) generating an outcome associated with a first game, (c) displaying the outcome on a display device, (d) awarding the player an award for the first game based at least in part on the generated first game outcome, (e) determining if a triggering condition occurred and displaying a second game on the display device upon determining the triggering condition has occurred, (f) calculating a current trigger cycle of the generated second game, the current trigger cycle being equal to a number of first games played after an occurrence of a previous second game triggering condition, (g) awarding the player an award for the second game based at least in part on the second game current trigger cycle.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 2A:
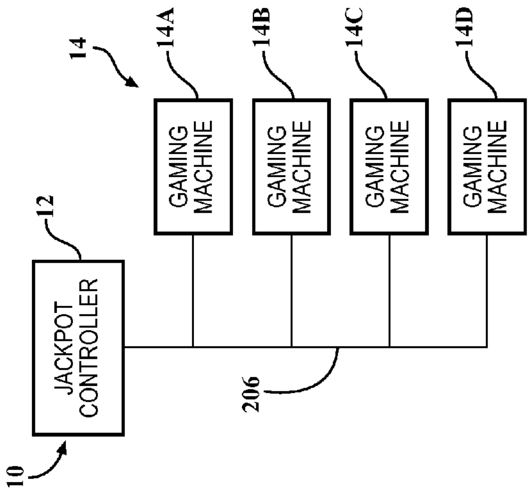
FIG. 2A is a diagram of an exemplary gaming system of the present invention, including the gaming machine shown in FIG. 1.

FIG. 1 is a perspective view of an exemplary gaming machine 14. FIG. 2A is a schematic view of an exemplary gaming system 10. In one embodiment, gaming system 10 includes a jackpot controller 12 and a plurality of gaming machines 14. In the illustrated embodiment, the gaming system 10 includes four gaming machines 14A, 14B, 14C, 14D, which in one embodiment may be arranged in a bank, i.e., are arranged together, adjacently. It should be noted, however, that the gaming system 10 may include any number of gaming machines 14 that may be arranged in any manner, such as in a circle or along a curved arc, or positioned within separate areas of a casino floor, and/or separate gaming establishments such as different casinos. Furthermore, additional groups of gaming machines 14 may be coupled to the jackpot controller 12. In one embodiment, the jackpot controller 12 may be implemented by one of the gaming machines 14. In still another embodiment, the jackpot controller 12 may be located remotely with respect to the gaming machines 14, or within one of the gaming machines 14, and may be configured to perform all of the functions for each gaming machine 14 and the jackpot controller 12.

Referring to FIG. 1, in the illustrated embodiment, each gaming machine 14 is positioned on a gaming stand 15, and comprises a box-shaped modular cabinet 16. One such cabinet is disclosed in commonly owned U.S. Patent Application Publication No. 2010/0087259 (Ser. No. 12/287,428), filed Oct. 8, 2008, which is hereby incorporated by reference.

The gaming machine 14 has a modular structure for a video gaming machine of an embodiment of the present invention. The gaming machine 14 includes a user input device 18 and a display device 19. Display device 19 includes a first display 20A and a second display 20B. In the illustrated embodiment, the gaming machine 14 is configured by a first cabinet 16A including a first display 20A, a second cabinet 16B including a second display 20B, a third cabinet 16C including the user input device 18 for playing the game, and a fourth cabinet 16D including a controller for controlling each section of the gaming machine 14.

As shown in FIG. 1, a part of the top surface of the third cabinet 16C facing to the player is designed to be slanted downward so that the player can easily operate user input device 18 for the games displayed on the first display 20A and/or the second display 20B. In the illustrated embodiment, user input device 18 includes a plurality if input buttons 26, a coin slot 22, and a bill acceptor 24. The input buttons 26 include BET switches 4, selection switches 5, a MAXBET switch 6 a PAYOUT switch 7, and start buttons, i.e. SPIN/DEAL buttons 21 and 21A. The BET switches 4 include five switches from 1BET to 5BET. The selection switches 5 include five switches from 1 (one) select to 5 (five) selects of bet lines. A coin tray 30 is provided in the lower part of the third cabinet 16C. In addition, user input device 18 also includes an output device, for example, a printer 20 for outputting printed material pertaining to the game of the gaming machine 14 such as, for example, a printed voucher ticket that includes information indicative of an amount of credits and/or money paid out to the player by the gaming machine 14 during a gaming session. The voucher ticket may be used at other gaming machines, or redeemed for cash, and/or other items as part of the casino cashless system.

The BET switches 4 are switches for inputting a bet on the game. The player can input a bet from 1BET to 5BET using the BET switches 4 one time for a game. A selection switch 5 is a switch for, for example, selecting a line on the reels and the card, which the player wants to set on the games.

The MAXBET switch 6 is a switch for inputting the maximum bet that a player can spend against one time of a game. The PAYOUT switch 7 is a switch for rewarding the amount of money to a player, which has been credited onto the gaming machine 14. The start buttons 21, 21A are buttons for starting game. The starting buttons 21, 21A may be arranged on the slanted surface 16E of the third cabinet 16C and sidewall of the third cabinet 16C so that the player can select the starting button for his or her preference in this embodiment.

The coin slot 22 includes an opening that is configured to receive coins and/or tokens deposited by the player into the gaming machine 14. The gaming machine 14 converts a value of the coins and/or tokens to a corresponding amount of gaming credits that are used by the player to wager on games played on the gaming machine 14. The bill acceptor 24 includes an input and output device that is configured to accept a bill, a ticket, and/or a cash card into the gaming machine 14 to enable an amount of gaming credits associated with a monetary value of the bills, ticket, and/or cash card to be credited to the gaming machine 14. Moreover, the gaming machine 14 may also utilize a cashless wagering system (not shown), such as a ticket in ticket out (TITO) system (not shown). In one embodiment, the bill acceptor 24 also includes a printer (not shown) that is configured to dispense a printed voucher ticket that includes information indicative of an amount of credits and/or money paid out to the player by the gaming machine 14 during a gaming session. The voucher ticket may be used at other gaming machines, or redeemed for cash, and/or other items as part of the casino cashless system.

A coin tray 30 is coupled to the lower cabinet 16C and is configured to receive a plurality of coins that are dispensed from the gaming machine 14. One or more speakers 32 are installed inside the cabinet assembly 16 to generate voice announcements and/or sound effects associated with game play. The gaming machine 10 also includes one or more lighting devices 34 that are configured to blink and/or change brightness and color in specific patterns to produce lighting effects to enhance a visual gaming experience for the player.

In one embodiment, the first display 20A is configured to display game play instructions (not shown) for performing the game including, but not limited to, playing instructions, paytables, paylines, betting lines and/or any other information to enable the gaming machine 14 to function as described herein. The second display 20B is configured to display a game screen 36 (shown in FIG. 3) including indicia and/or symbols for use in a game, e.g., cards used by a card game, roulette wheel and symbols used in a roulette game, and reels used in a reel game. The game screen 36 may include any type of game including, but not limited to, a video slot game, a keno game, a blackjack game, a video poker game, or any type of game which allows a player to make a wager, play a game, and potentially provide the player an award based on an outcome of the game and a paytable. Moreover, each display 20A and 20B may be configured to display at least a portion of the game screen 36 and/or game play instructions.

Figure 3:
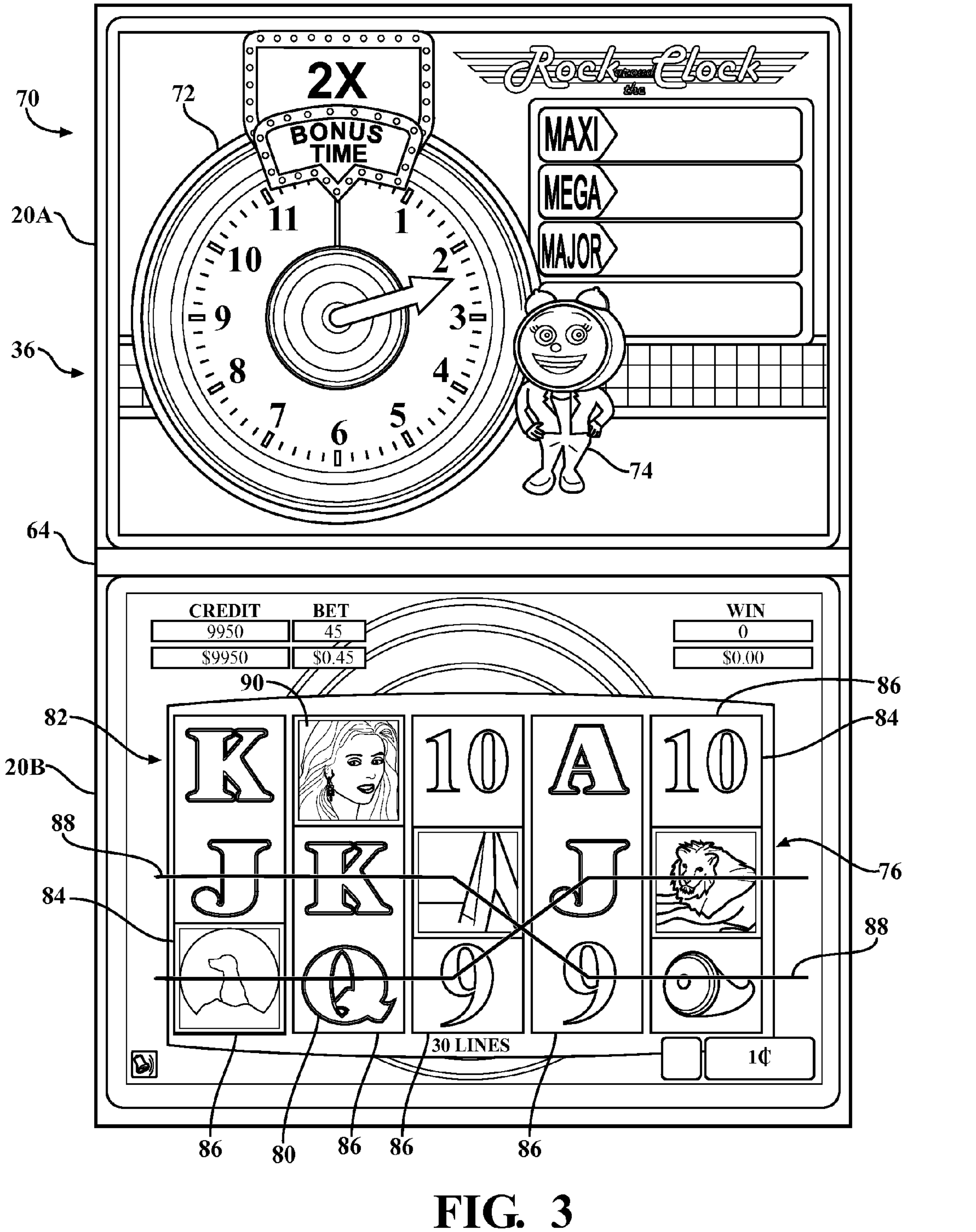
FIG. 3 is a diagrammatic illustration of a screen shot of a primary game and a secondary game, according to an embodiment of the present invention.
Figure 4:
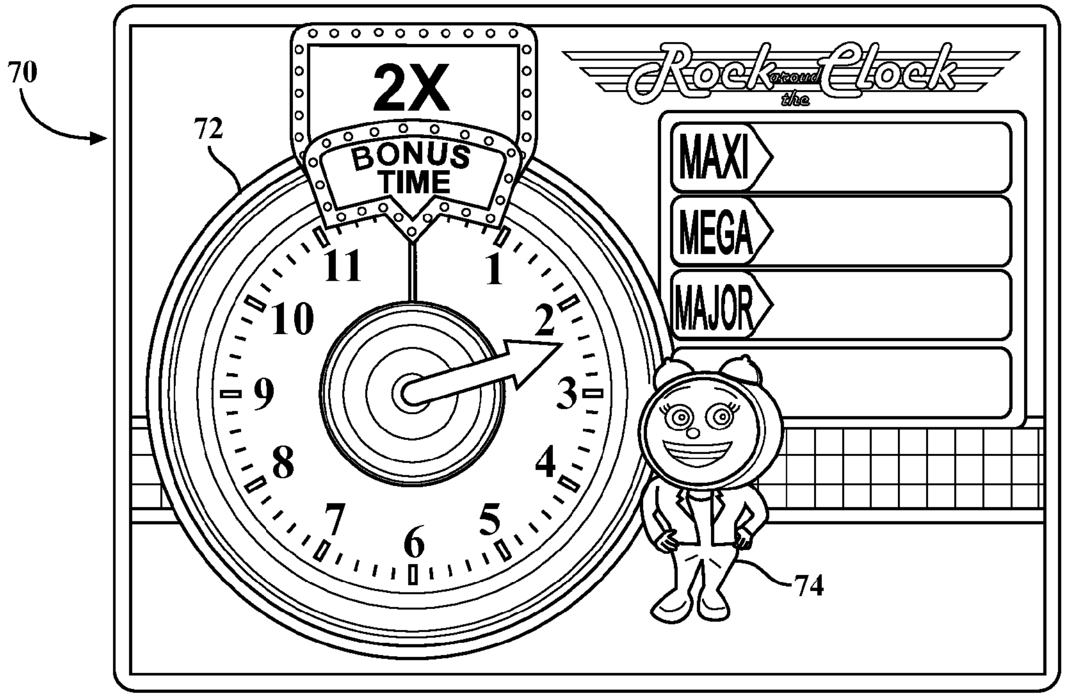
FIG. 4 is a diagrammatic illustration of a second screen shot of the secondary game of FIG. 3.
Figure 5:
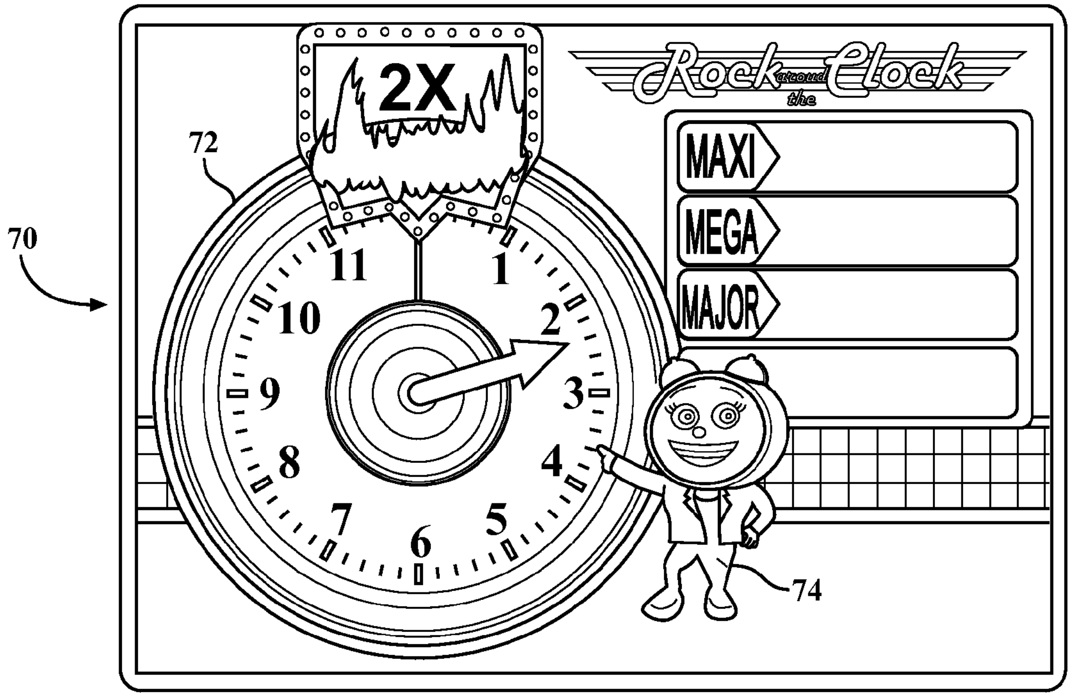
FIG. 5 is a diagrammatic illustration of a third screen shot of the secondary game of FIG. 3.
Figure 6:
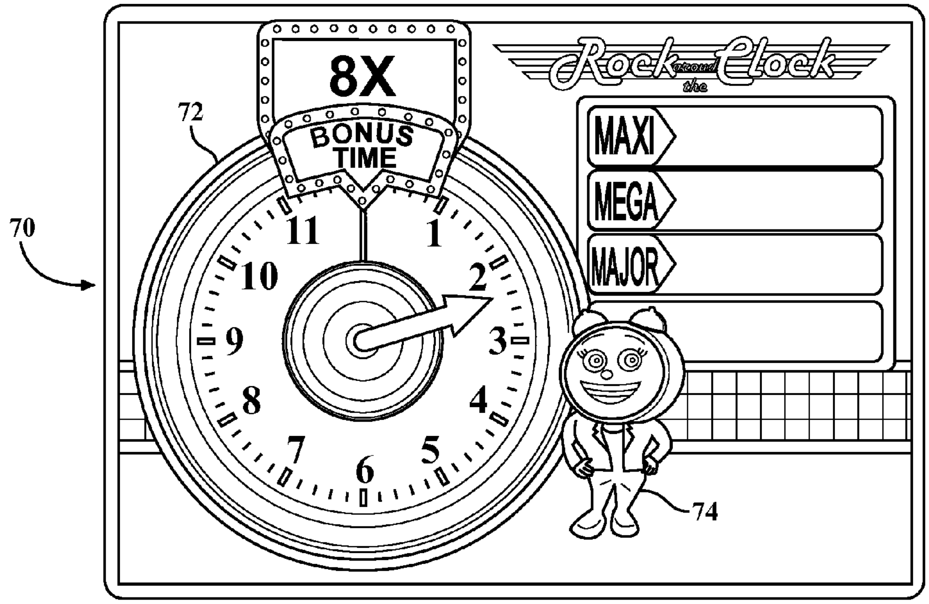
FIG. 6 is a diagrammatic illustration of a fourth screen shot of the secondary game of FIG. 3.

In the illustrated embodiment, second display 20B is configured to display the first game 76, i.e. the primary game (shown in FIG. 3), and the first display 20A is configured to display the second game 70, i.e. the bonus game and/or bonus feature (shown in FIG. 3). In one embodiment, first and second displays 20A and 20B each include a flat panel display, such as a cathode ray tube display (CRT), a liquid crystal display (LCD), a light-emitting diode display (LED), a plasma display, and/or any suitable visual output device capable of displaying graphical data and/or text to a user. Alternatively, a single component, such as a touch screen, may function as both the display device 19 and as the user input device 18.

Figure 2C:
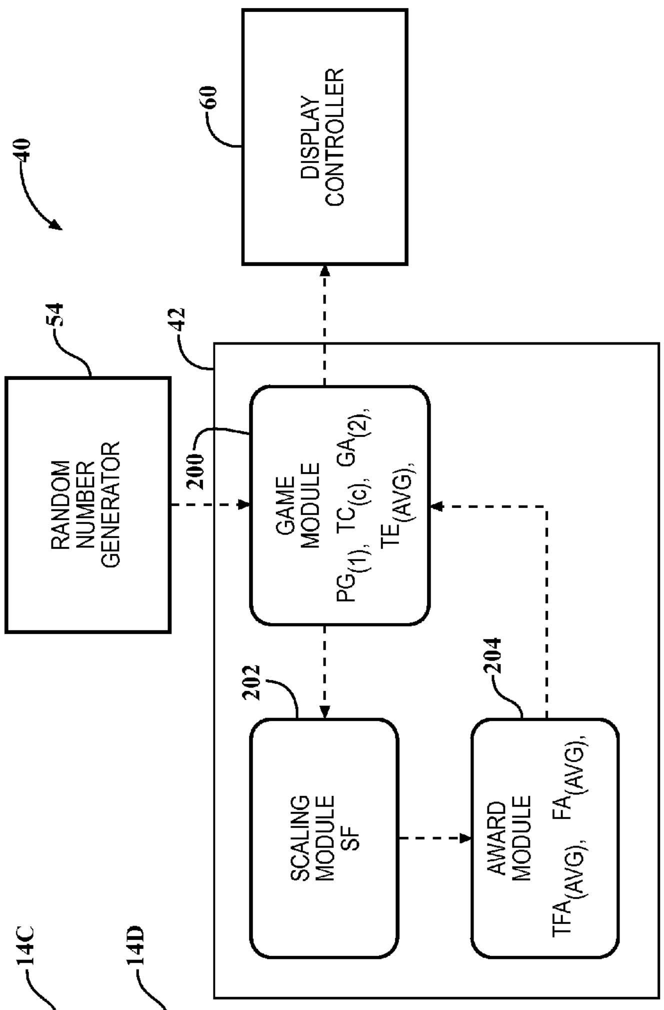
FIG. 2C is another schematic representation of the gaming machine shown in FIG. 1.
Figure 2B:
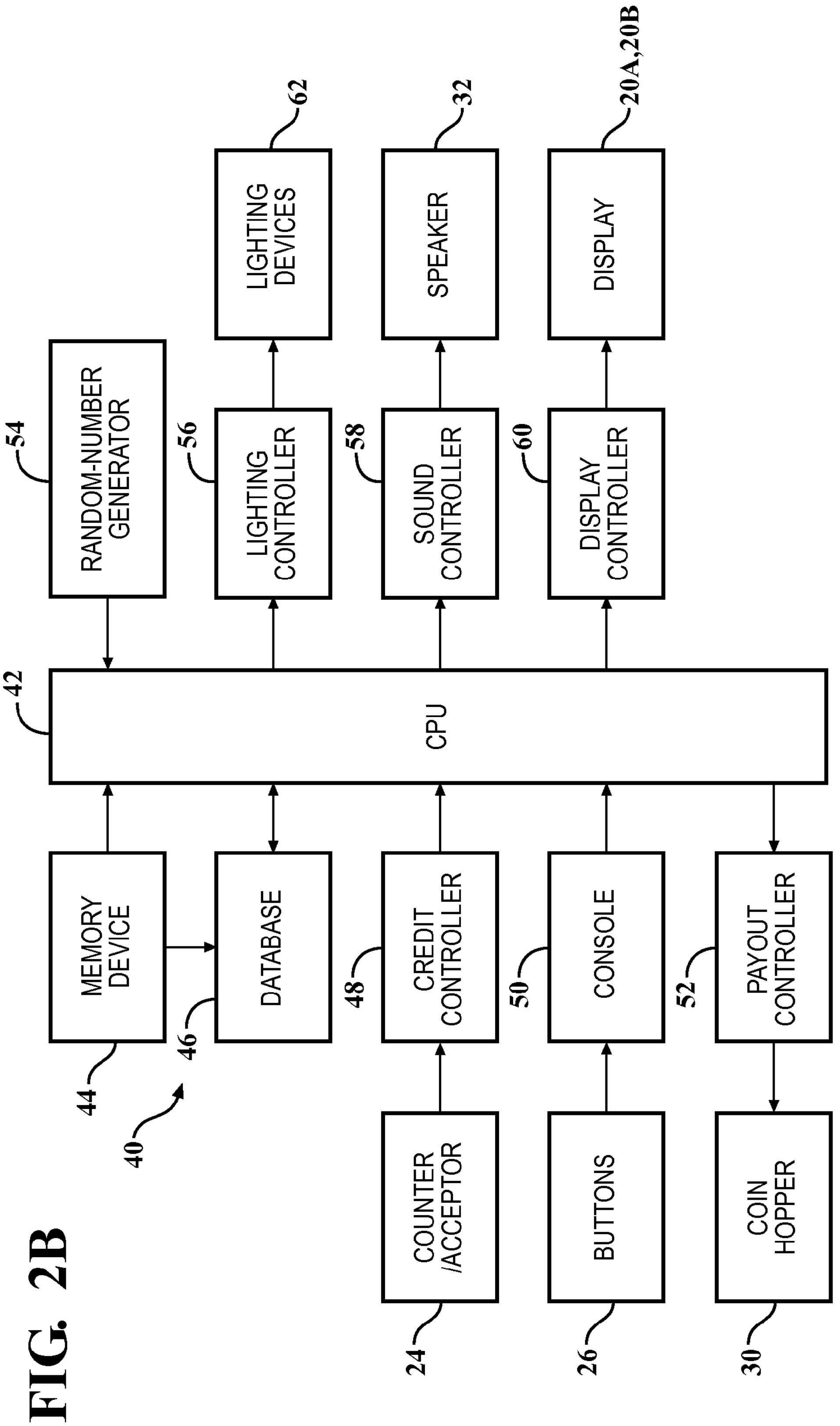
FIG. 2B is a schematic representation of the gaming machine shown in FIG. 1.

With specific reference to FIG. 2B, in the illustrated embodiment, each gaming machine 14 is controlled by a game controller 40. In one embodiment, the game controller 40 is within the cabinet 16. Alternatively, the game controller 40 may be separated from the cabinet 16, and connected to the components of the gaming machine 14 through a network such as, for example, a local area network (LAN), a wide area network (WAN), dial-in-connections, cable modems, wireless modems, and/or special high-speed Integrated Services Digital Network (ISDN) lines.

In the illustrated embodiment, the game controller 40 includes a processor, i.e. a central processing unit (CPU) 42, a memory device 44, a database 46, a credit controller 48, a console unit 50, a payout controller 52, a random-number generator 54, a lighting controller 56, a sound controller 58, and a display controller 60. Memory device 44 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 42 to store, retrieve, and/or execute instructions and/or data.

The CPU 42 executes various programs, and thereby controls other components of the game controller 40 according to player instructions and data accepted by the user input device 18. The CPU 42 in particular executes a game program, and thereby conducts a game in accordance with the embodiments described herein. The memory device 44 stores programs and databases used by the CPU 42. Moreover, the memory device 44 stores and retrieves information in the database 46 including image data for producing game images and screens on the display device 19, and temporarily stores variables, parameters, and the like that are used by the CPU 42. In addition, the memory device 44 stores indicia, symbol weights, paytables, and/or winning combination tables which represent relationships between combinations of random numbers and types of awards. In one embodiment, the memory device 44 utilizes RAM to temporarily store programs and data necessary for the progress of the game, and EPROM to store, in advance, programs and data for controlling basic operation of the gaming machine 10, such as the booting operation thereof.

The credit controller 48 manages the amount of player's credits, which is equivalent to the amount of coins and bills counted and validated by the counter/acceptor 24. The console unit 50 monitors the input buttons 26 and accepts various instructions and data that a player enters through the input buttons 26. The payout controller 52 changes player's credits to coins, bills, or other monetary data by using the coin tray 30 or the like.

The random-number generator (RNG) 54 generates and outputs random numbers to the CPU 42 preferably at the start of each round of game. The CPU 42 uses the random numbers to determine an outcome of the primary and secondary games.

For example, if the primary game is a video slot game, the CPU 42 uses the RNG 54 to randomly select an arrangement of symbols to be displayed on the video reels.

The CPU 42 generally uses the random numbers to play the primary and secondary games and to determine whether or not to provide an award to a player at random in the following manner. The CPU 42 retrieves the random numbers from a winning combination table stored in the memory device 44. The winning combination table represents relationship between combinations of random numbers and types of awards. For example, if the primary game is a video slot game, the CPU 42 uses the RNG 54 to randomly select an arrangement of symbols to be displayed on video reels. Moreover, the CPU 42 generally uses random numbers generated by the RNG 54 to play the primary games, to initiate bonus features, and/or secondary games, and to determine whether or not to provide an award to a player. In addition, the CPU 42 generates game outcomes including combinations of random numbers, and compares the generated combinations with winning combinations stored in the winning combination table to determine if the generated outcome is a winning outcome that is associated with a type of award.

The lighting controller 56 controls one or more lighting devices 62. The lighting controller 56 thereby causes the lighting devices 62 to blink and/or change brightness and color in specific patterns in order to produces lighting effects. In one embodiment, the lighting devices 62 include light devices 34 and a podium payline light 64

The podium payline light 64 which is, as shown in FIG. 3, located between the first and second displays 20A, 20B. In one embodiment, during the second game 70, the first and second displays 20A, 20B, and the Podium payline light 64 are utilized as a large rotating selector device, wherein the Podium payline light 64 serves as a selector for the rotating selector device. In one embodiment, the rotating selector device is a large reel which rotates vertically. In another embodiment, the rotating selector device is a wheel. It should be noted that other designs of the rotating selector device may be used without departing from the spirit of the invention.

In another embodiment, the second game 70 is displayed only on the first display 20A. The sound controller 58 controls the speakers 32 to output voice announcements and sound effects during game play.

The display controller 60 controls the displays 20A, 20B to display various images on screens preferably by using computer graphics and image data stored in the ROM 44. The display controller 60 in particular controls video reels in a game screen displayed on the second display 20B by using computer graphics and the image data. The display controller 60 further controls video reels in different manners depending on whether a round of game is in a normal or bonus mode.

It should be noted that the above described gaming machine 14 is for exemplary purposes only. The present invention is not limited to any particular gaming machine 14 and/or game. The gaming machine 14 may also include other features. For example, the gaming machine 14 may include a player tracking device (not shown) which is connected to a player tracking system. The gaming machine 14 may also utilize a cashless wagering system (not shown), such as a ticket in ticket out (TITO) system (not shown) and may include a player tracking device (not shown).

The game controller 40 displays the first game 76 on the display 20A. In one embodiment, the first game 76 is a video slot game, as show in FIG. 3. However, it should be noted that the first game 76 could be any type of game upon which a player could make a wager.

FIG. 3 is an exemplary graphical display of the first game 76 that is displayed by the gaming machine 14. In the illustrated embodiment, the game controller 40 is configured to display the first game 76 on the display device 19. In addition, the game controller 40 is configured to display, a bonus feature and/or a second game 70. The bonus feature and/or the second game 70 may be substantially similar to the first game 76. In one embodiment, the first game 76 is a video slot game. However, it should be noted that the first game 76 may be any type of game upon which a player could make a wager including, but not limited to a keno game, a blackjack game, a video poker game, or any type of game that enables the gaming machine 14 to function as described herein.

In general, during play of the first game 76, the game controller 40 randomly selects a plurality of game elements 80 such as, for example, video reel symbols, from a predefined set of possible game elements to be displayed on the display device 19. The game controller 40 displays each first game 76 to include a plurality of game elements 80 that are displayed in a grid 82 having a plurality of cells 84 defined by rows and/or columns. First game 76, in one embodiment, includes 5 columns or reels 86 with 3 cells 84 per reel 86, respectively (a "5×3" arrangement). Alternatively, other video reel arrangements may be used, such as 4-5-5-5-4, 3-4-3-4-3, or 4-5-4-5-4 configurations or configurations with the same number of cells per column, such as 3×3, 3×4, 4×5, or 5×5 configurations.

Each video slot game is generally first played in a conventional manner. The player makes a wager, which may be based on a predetermined denomination and a selected number of paylines 88. The reels are spun and game symbols or elements are randomly chosen for each cell 84. If a predetermined pattern of elements 80 are randomly chosen for each cell 84 on a played payline 88, the player may be awarded a payout based on the selected payline, the wager, and a predetermined paytable. Moreover, the player may be awarded a payout if the combination of elements associated with a selected payline is a winning combination. In addition, a player may receive a bonus feature and/or a bonus game based on the combination of elements associated with the selected payline. Many variations to the above described general play of a video slot game fall within the scope of the present invention. Such video slot games are well-known in the art, and are therefore not further discussed.

The gaming machine 14 receives a signal, from the user input device 18, that is indicative of a player's selection to initiate a gaming session including a wager amount, and a selection of one or more paylines 88 associated with a predefined set of cells 84 within the displayed grid 82. In the illustrated embodiment, the gaming machine 14 is a multi-line game, i.e., the paylines include horizontal paylines and/or diagonal pay-lines, and/or zig-zag paylines. The user input device 18 may allow the player to toggle to increase the bet per payline a credit at a time (up to the maximum bet). The game controller 40 randomly generates an outcome of the first game 76, and displays the generated outcome on the display device 19. In one embodiment, the game controller 40 is configured to rotate, and/or spin each reel 86 to initiate a game play, and stop each reel 86 to display a plurality of symbols 80 associated with the randomly generated outcome. In addition, the game controller 40 is adapted to determine if the generated outcome is a winning outcome based on the displayed game elements 80, a pay-table, a wager, and one or more selected paylines 88. More specifically, the gaming machine 14 determines if a combination of symbols 80 displayed in the set of cells 84 associated with the selected payline 88 is a winning combination. The game controller 40 may provide an award in response to the outcome of the first game 76. In general, the term "award" may be a payout, in terms of credits or money. Thus, the game controller 40 may award a regular payout in response to the outcome of the first game 76. However, it should be noted that the term award may also refer to other types of awards, including, prizes, e.g., meals, show tickets, etc . . . , as well as in-game award, such as free games or awarding the player one or more wild symbols or stacked wild symbols in each of the games.

In the illustrated embodiment, the game controller 40 is also configured to determine if a triggering condition has occurred in the first game 76, and display the second game 70 on the display device 19 if the triggering condition has occurred. In one embodiment, the triggering condition is the appearance of one or more scatter symbols 90 in one or more reels 86 displayed in the first game outcome. In another embodiment, the triggering condition may be a predefined combination of symbols 80 arranged along one or more selected paylines 88. Moreover, the triggering condition may include an appearance of one or more predefined winning symbols such as, for example a "wild" symbol representative of any symbol along one or more selected paylines 88. Alternatively, the triggering condition may be any gaming condition such as, for example, any combination of symbols that occurs in the primary game outcome, or any suitable gaming condition that enables the gaming machine 14 to function as described herein.

FIG. 2C is another schematic representation of the gaming machine shown in FIG. 1. In the illustrated embodiment, the CPU 42 includes a game module 200, a scaling module 202, and an award module 204. The game module 200 is configured to receive, from user input device 18, a signal that is indicative of a player's wager associated with the first game 76, and randomly generate a first primary game outcome ($PG_{(1)}$) based at least in part on the random numbers received from the RNG 54. Moreover, the game module 200 transmits a signal indicative of the generated first game outcome ($PG_{(1)}$) to display controller 60 to display the first game outcome ($PG_{(1)}$) to the player via the display device 19. In addition, the game module 200 is configured to determine if the first game outcome ($PG_{(1)}$) includes a winning outcome, and may provide the player with an award of the first game outcome is a winning outcome. In addition, the game module 200 determines if a triggering condition occurs in the first game outcome ($PG_{(1)}$), and initiates the second game 70 if the triggering condition has occurred in the first game outcome ($PG_{(1)}$). Moreover, the game module 200 generates an outcome of the second game 70, and may award the player an award based at least in part on the generated second game outcome.

In one embodiment, the game module 200 calculates a current trigger cycle ($TC_{(c)}$) of the generated second game 70, and awards the player an award ($GA_2$) for the second game 70 based at least in part on the second game current trigger cycle ($TC_{(c)}$). The game module 200 is configured to establish the current trigger cycle ($TC_{(c)}$) to be approximately equal to a number of first games 76 played after an occurrence of a previous second game triggering condition.

In an alternative embodiment, the game module 200 randomly selects a trigger event cycle including a number of first games to be played before the occurrence of the second game triggering condition, and determines the triggering condition has occurred if the calculated current trigger cycle ($TC_{(c)}$) is approximately equal to the selected trigger event cycle. In one embodiment, the game module 200 selects the trigger event cycle from a predefined range of trigger event cycles.

In the illustrated embodiment, the award module 204 establishes a total average feature award ($TFA_{(avg)}$) associated with the second game 70. The total average feature award ($TFA_{avg)}$) is the average award provided to the player over a predefined period of time. The total average feature award ($TFA_{avg)}$) may be, for example, an average amount of credits awarded to a player during play of the second game 70 over a predefined period of time.

The game module 200 determines the current trigger cycle ($TC_{(c)}$) of the second game 70 and transmits a signal indicative of the current trigger cycle ($TC_{(c)}$) to the award module 204. The award module 204 establishes an average feature award ($FA_{(avg)}$) associated with the current trigger cycle ($TC_{(c)}$) based at least in part on the total average feature award ($TFA_{(avg)}$). The average feature award ($FA_{(avg)}$) is approximated equal to the average award provided to the player for each second game 70 triggered at the current trigger cycle. The award module 204 transmits a signal indicative of the average feature award ($FA_{avg)}$) to the game module 200. The game module 200 awards the player the second game award ($GA_2$) based at least in part on the average feature award ($FA_{(avg)}$).

The game module 200 also establishes an average trigger event cycle ($TE_{(avg)}$) associated with the second game 70 that is approximate equal to the average number of first games 76 that are played before the triggering condition occurs. The award module 204 is configured to establish the average feature award ($FA_{(avg)}$) associated with the current trigger cycle ($TC_{(c)}$) based at least in part on the average trigger event cycle ($TE_{(avg)}$) and the total average feature award ($TFA_{(avg)}$).

In one embodiment, the scaling module 202 calculates a scaling factor value (SF) that is associated with each trigger cycle of the second game 70. The scaling module 202 receives, from the game module 200, a signal indicative of the current trigger cycle ($TC_{(c)}$), and calculates the scaling factor value (SF) based on the current trigger cycle ($TC_{(c(}$) and the average trigger event cycle ($TE_{(avg)}$). More specifically, the scaling factor value (SF) is calculated to be approximately equal to a ratio of the associated trigger cycle ($TC_{(c)}$) and the average trigger event cycle ($TE_{(avg)}$). The scaling module 202 then transmits a signal indicative of the scaling factor value (SF) to the award module 204. The award module 204 calculates the average feature award ($FA_{(avg)}$) associated with the current trigger cycle ($TC_{(c)}$) based at least in part on the associated scaling factor value (SF) and the total average feature award ($TFA_{(avg)}$).

In one embodiment, the scaling factor value (SF) is calculated based on the following equation:

Scaling Factor=(Trigger cycle of current feature)/(Average Trigger Cycle)

The average feature award ($FA_{(avg)}$) for a particular trigger cycle is calculated based on the following equation:

Average Feature Award=(Scaling Factor)*(Total Average Feature Award)*(Bonus Multiplier)

In addition the feature return is calculated based on the following equation:

Feature Return=(Average Feature Payout)/(Average Trigger Cycle)

In one embodiment, the award module 204 establishes the average feature award ($FA(_{avg})$) associated with the current trigger cycle ($TC_{(c)}$) to be less than the total average feature award ($TFA_{(avg)}$), if the current trigger cycle ($TC_{(c)}$) is less than the average trigger event cycle ($TE_{(avg)}$). In addition, the award module 204 establishes the average feature award ($FA_{(avg)}$) associated with the current trigger cycle ($TC_{(c)}$) to be greater than the total average feature award ($TFA_{(avg)}$), if the current trigger cycle ($TC((_{c})$) is greater than the average trigger event cycle ($TE_{(avg)}$). Moreover, the award module 204 establishes the average feature award ($FA_{(avg)}$) to be approximately equal to the total average feature award ($TFA_{(avg)}$), if the current trigger cycle ($TC_{(c)}$) is approximately equal to the average trigger event cycle ($TE_{(avg)}$).

In the illustrative embodiment, the second game award ($GA_2$) includes a plurality of awards such as, for example, a plurality of bonus features that may occur during the second game 70, wherein each bonus feature includes an associated award. The plurality of second game awards includes a first award ($A_1$) and at least one second award ($A_2$). The award module 204 establishes an award weight, i.e. a probability of occurrence, associated with each first and second award ($A_1$) and ($A_2$). More specifically, the award module 204 establishes a first weight ($P_{(A1)}$) associated with the first award ($A_1$), and a second weight ($P_{(A2)}$) associated the second award ($A_2$). Moreover, the game controller 40 modifies the first award weight ($P_{(A1)}$) and the second award weight ($P_{(A2)}$) based at least in part on the average feature award ($FA_{(avg)}$) associated with each trigger cycle.

For example, the value of the average feature award ($FA_{(avg)}$), the value of the scaling factor (SF), and the award weights established for the first and second awards ($P_{(A1)}$) and ($P_{(A2)}$) may be provided as in the following chart, wherein the average trigger cycle ($TE_{(avg)}$) is equal to 100 cycles, the total average feature award ($TFA_{(avg)}$) is equal to 60 credits, the feature award associated with the first award ($A_1$) is equal to 20 credits, and the feature award associated with the second award ($A_2$) is equal to 80 credits.

| Current Trigger Cycle | Scaling Factor | Average feature award | Probability of First Award | Probability of Second Award |
|---|---|---|---|---|
| 50 | 0.5 | 30 | 87.50% | 12.50% |
| 60 | 0.6 | 36 | 80.00% | 20.00% |
| 70 | 0.7 | 42 | 72.50% | 27.50% |
| 80 | 0.8 | 48 | 65.00% | 35.00% |
| 90 | 0.9 | 54 | 57.50% | 42.50% |
| 100 | 1.0 | 60 | 50.00% | 50.00% |
| 110 | 1.1 | 66 | 42.50% | 57.50% |
| 120 | 1.2 | 72 | 35.00% | 65.00% |
| 130 | 1.3 | 78 | 27.50% | 72.50% |
| 140 | 1.4 | 84 | 20.00% | 80.00% |
| 150 | 1.5 | 90 | 12.50% | 87.50% |

The first column represents the current trigger cycle ($TC_{(c)}$) of the second game 70, i.e. the number of first games played before the triggering condition occurs in the first game 76. The second column represents the calculated scaling factor value (SF) associated with each current trigger cycle ($TC_{(c)}$). The third column represents the calculated average feature award ($FA_{(avg)}$) associated with each current trigger cycle ($TC_{(c)}$). The forth column represents the calculated probability of winning the first award ($P_{(A1)}$). The fifth column represents the calculated probability of winning the second award ($P_{(A2)}$).

In the above illustrated example, if the triggering condition occurs when the current trigger cycle ($TC_{(c)}$) is equal to the average trigger cycle ($TE_{(avg)}$), the scaling factor value (SF) is calculated to be 1.0, and the average feature award ($FA_{(avg)}$) is approximately equal to the total average feature award ($TFA_{(avg)}$). In addition, the probabilities associated with the first and second awards ($P_{(A1)}$) and ($P_{(A2)}$) are established such that average feature award is approximately equal to the total average feature award.

In another embodiment, the game controller 40 is configured to determine the second game award based on a paytable including a plurality of award amounts associated with a plurality of symbol combinations. In one embodiment, the game controller 40 is configured to establish a plurality of paytables associated with each trigger event cycle. More specifically, the game controller 40 is configured to calculate the average feature award ($FA_{(avg)}$) associated with the current trigger event cycle ($TC_{(c)}$), and establish a current trigger event paytable based on the average feature award ($FA_{(avg)}$) such that the average award provided during the second game 70 for the current trigger cycle is approximately equal to the calculated average feature award ($FA_{(avg)}$). In an alternative embodiment, the game controller 40 is configured to modify a symbol weight, i.e. the probability of the symbol occurring in the second game outcome, for each reel symbol 80 based on the calculated average feature award, and determine the second game award based at least in part on the modified symbol weights.

In one aspect of the present invention, a bonus multiplier is applied to the second game award ($GA_2$). The award module 204 establishes the bonus multiplier (B) to be approximately equal to the average wager amount wagered by the player. In one embodiment, the award module 204 calculates the bonus multiplier (B) based on the average amount of each wager made between each second game 70 played.

In the illustrated embodiment, during game play, if the triggering condition occurs in the first game 76, the game controller 40 calculates the current trigger cycle ($TC_{(c)}$), and calculates the scaling factor value (SF) associated with the current trigger cycle ($TC_{(c)}$). The game controller 40 than calculates the average feature award ($FA_{(avg)}$) associated with the current trigger cycle ($TC_{(c)}$) based at least on part on the total average feature award ($TFA_{(avg)}$) and the calculated scaling factor (SF). In addition, the game controller 40 calculates the probability of the first award ($P_{(A1)}$) and the probability of the second award ($P_{(A2)}$) based at least in part on the calculated average feature award ($FA_{(avg)}$), and determines the second game award ($GA_2$) award to be provided to the player based on the calculated first award probability ($P_{(A1)}$) and the second award probability ($P_{(A2)}$).

With reference to FIG. 2A, gaming system 10 includes a plurality of linked gaming machines 14, and the jackpot controller 12 that is coupled to each gaming machine 14. In one embodiment, each gaming machine 14 and the game controller 40 are coupled in a local area network (LAN) 206. Alternatively, each gaming machine 14 and the jackpot controller 12 may be coupled via a network such as, for example, an Internet link, an intranet, a WAN, dial-in-connections, cable modems, wireless modems, and/or ISDN lines. In one embodiment, the jackpot controller 12 may be implemented by one of the game controllers 40 associated with a gaming machine 14. In still another embodiment, the jackpot controller 12 may be located remotely with respect to the gaming machines 14, or within one of the gaming machine cabinets 16 (shown in FIG. 1), and may be configured to perform all of the functions of the game controllers 40 for each gaming machine 14 and the jackpot controller 12. The jackpot controller 12 determines if a triggering condition occurred in one of the first games 76 and initiates the second game 70. The outcome of the second game 70 is displayed using a rotating selector device 72. The jackpot controller 12 randomly selects an outcome of the second game 70, spins rotating selector device 72, and awards one or more of the players a secondary award as a function of the outcome of the second game 70.

In the illustrated embodiment, the jackpot controller 12 includes CPU 42 and memory device 44. The jackpot controller 12 is configured to receive a signal indicative of the player's selection to initiate a first gaming session on an associated gaming machine 14, receive a signal indicative of the player's wager associated with the first game 76 (shown in FIG. 3), generate an outcome of the first game 76, and award the player an award if the first game outcome is a winning outcome.

The jackpot controller 12 also determines if a triggering condition has occurred in a first game 76 played on an associated gaming machine 14, and generates and displays a second game 70 on the associated gaming machine 14 if the triggering condition has occurred. In addition, the jackpot controller 12 calculates a current trigger cycle of the generated second game 70, and awards the player an award for the second game 70 based at least in part on the second game current trigger cycle. In one embodiment, the jackpot controller 12 determines whether the triggering condition has occurred in one or more of the linked gaming machines 14, and displays a second game 70 on each linked gaming machine 14 being played.

With reference to FIGS. 3-6, the present invention is used to implement a game titled "Rock Around the Clock". In the Rock around the Clock game, the player advances to bonus time, with every bought game, i.e., the first game 76.

With specific reference to FIG. 3, when the clock 72 strikes BONUS TIME, a feature game, i.e. second game 76 is awarded. All feature games may be multiplied by the current bonus time multiplier (indicated by the arrow on the clock). During first game 76 play the Mascot 74 may randomly increase the multiplier to a higher value.

With Reference to FIGS. 7-14, another embodiment of the present invention will now be explained. Rock around the Clock 2 (RAC2) is a slot game. RAC2 may be designed as a blank style traditional stepper game. In this embodiment, the game will be a 27 ways game. The minimum bet may be set for 50 credits. It may have 3 bonus games each with an upgrade feature for a total of 6 bonus features. The first bonus game will use the light wheel, the second will use the twin LCD display, i.e. first and second displays 20A and 20B, and the third bonus game will be a mechanical reel game (not shown).

Figure 7:
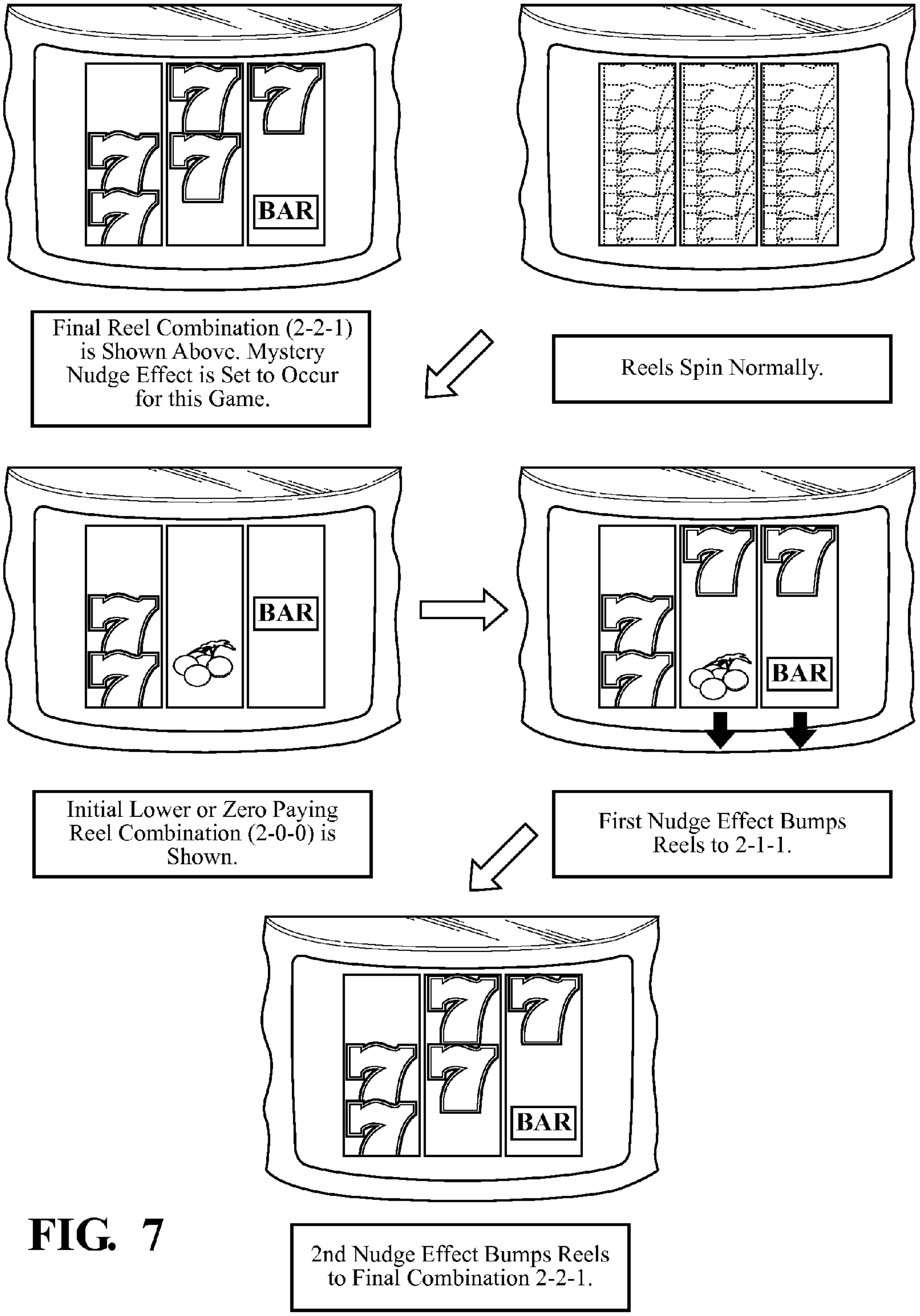

The first game 76 is a standard 27 ways game which may use the Action Stacked Symbols®. A mystery nudge is design is designed to create player expectation after the third reel stop and there is a small or no stacked symbol win. In general, when a stacked symbol win actually occurs, the gaming machine 14 will sometimes spin to a lesser or zero paying combination and then nudge one or more reels 86 to their final stop positions after the 3rd reel stops. FIG. 7 illustrates a sequence of game screen shots in accordance with the above-described example.

With reference to FIGS. 17-22, For example, Table 1 illustrates a plurality of possible stacked symbol combinations and the chance for a mystery nudge to occur associated with each combination. During game play, if the actual reel stop positions produce combination #20, as shown in Table 1, gaming machine 14 will establish a 55% chance that a mystery nudge effect will occur. If a mystery nudge effect does occur, the gaming machine 14 then determines which reels will include the nudging effect.

Table 2 illustrates a example of possible reel combinations in which the nudging effect may occur. The gaming machine 14 randomly selects a pattern from Table 2 and determines which reel will include the nudging effect based on the selected pattern. For example, if pattern #4 is selected, the gaming machine 14 determines that the nudge effect will occur on reels 2 and 3.

The gaming machine 14 also determines how many symbols will initially appear for each reel that will be nudged. Table 3 illustrates an example of the initial number of symbols to be displayed based on the final number of symbols displayed in the outcome. The gaming machine 14 selects the initial number of symbols to be displayed for each reel that includes the nudging effect based on the probabilities included in Table 3. For example, because the nudging effect occurs on reels 2 and 3, as discussed above, the gaming machine 14 establishes the initial symbol probabilities from Table 2 once for reel #2 and once for reel #3. In accordance with the values illustrated in Table 3, for reel #2, the final number of symbols will be two, and there is a 30% chance that 1 symbol and a 70% that 0 symbols will initially be displayed. For reel #3, since the final number of symbols is 1, there is 100% chance that this reel will initially display 0 stacked symbols. In this example, assume 0 symbols will be initially shown on reel #2. The initial stacked symbol combination will therefore be 2-0-0. The first nudge effect will make this 2-1-1 and the second nudge will make this the final correct combination of 2-2-1. FIG. 7 illustrates a sequence of game screen shots in accordance with the above-described example.

If the spin is going to be a long spin then a special table such as, for example, Table 4, may be used for reels 1 and 2 to guarantee that at least 1 CAR symbol is always displayed.

With reference to FIGS. 8-15, the Bonus Time clock is a visual indicator as to the chances of the player triggering the Bonus. In the illustrated example the bonus time clock is a 50's themed diner clock with an hour hand. When clock strikes twelve, one of three current bonus features will awarded to the player.

Figure 9:
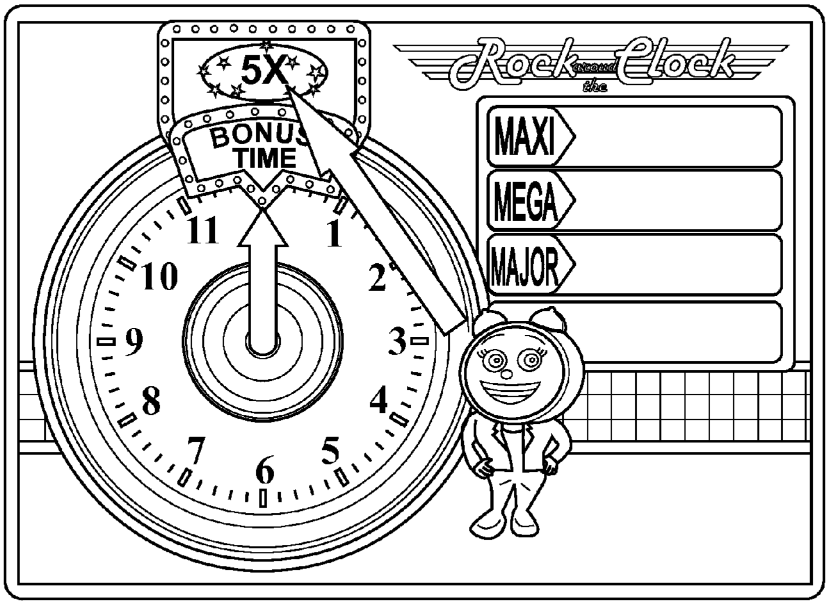
Figure 8:
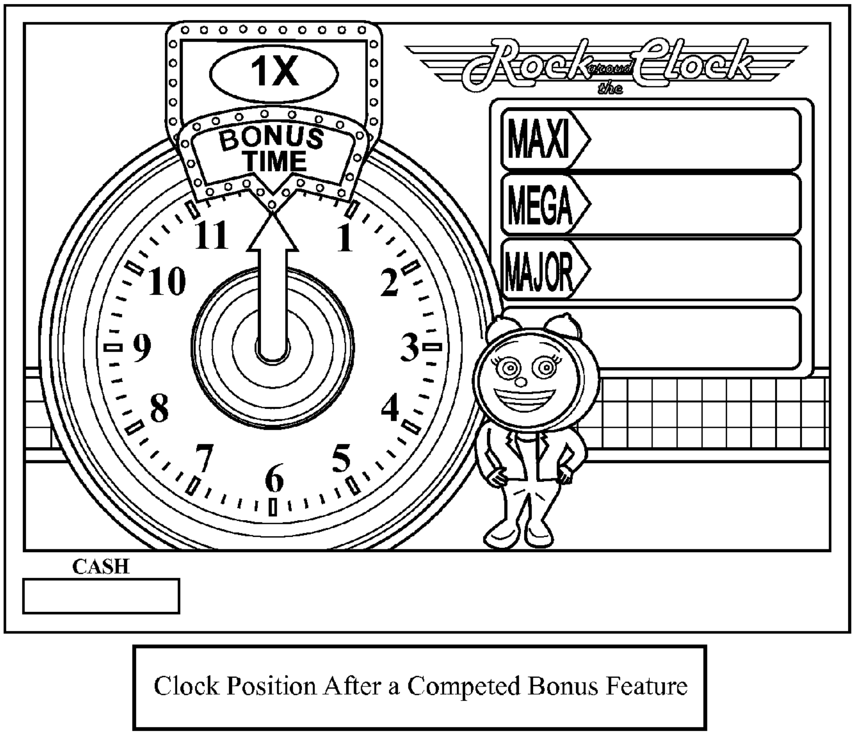
Figure 10A:
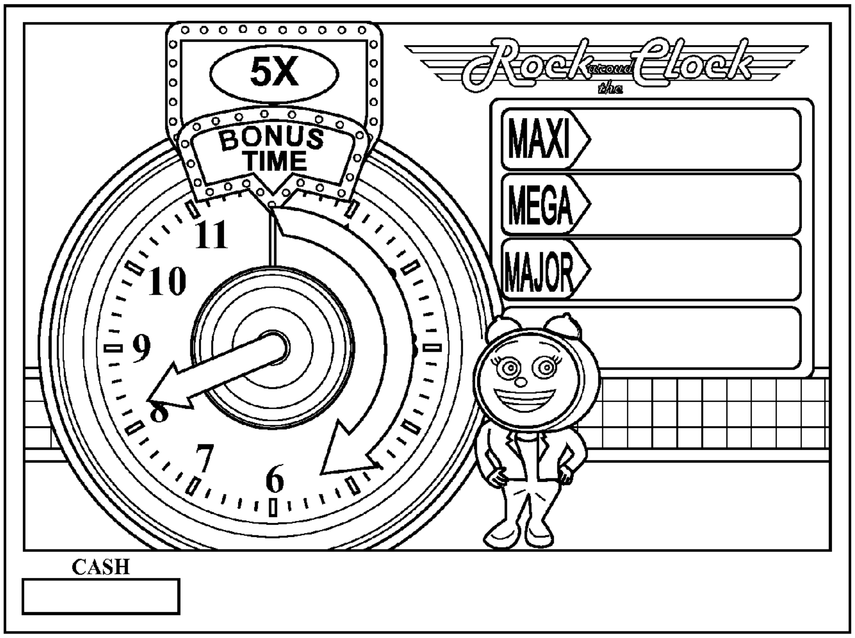
Figure 10B:
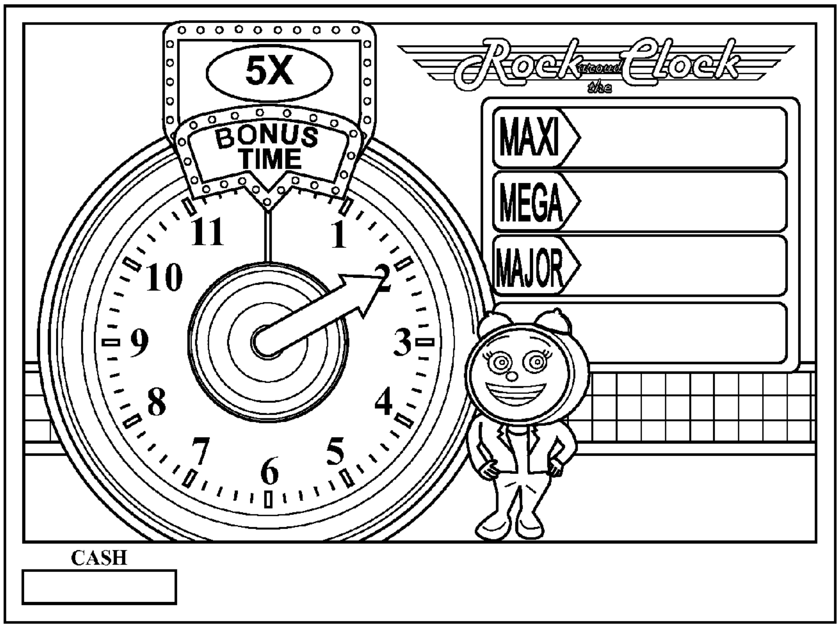

The awarding of extra bonus time units may be conveyed visually to the player via Mascot boosts. The player has just completed a bonus and is returning to the primary game screen. The clock hand is at 12 (FIG. 8). The first event that happens is the Mascot awards an initial multiplier boost. This is shown in FIG. 9. Next the Mascot gives an initial boost which is displayed visually as the clock hand spins round and round before stopping at a final start position (FIG. 10). The amount that will be awarded will be a function of the previous bonus game win and the current trigger game number. In general for very large or very small wins there will be a greater chance for a large initial boost to help keep the player from leaving the machine.

Figure 11A:
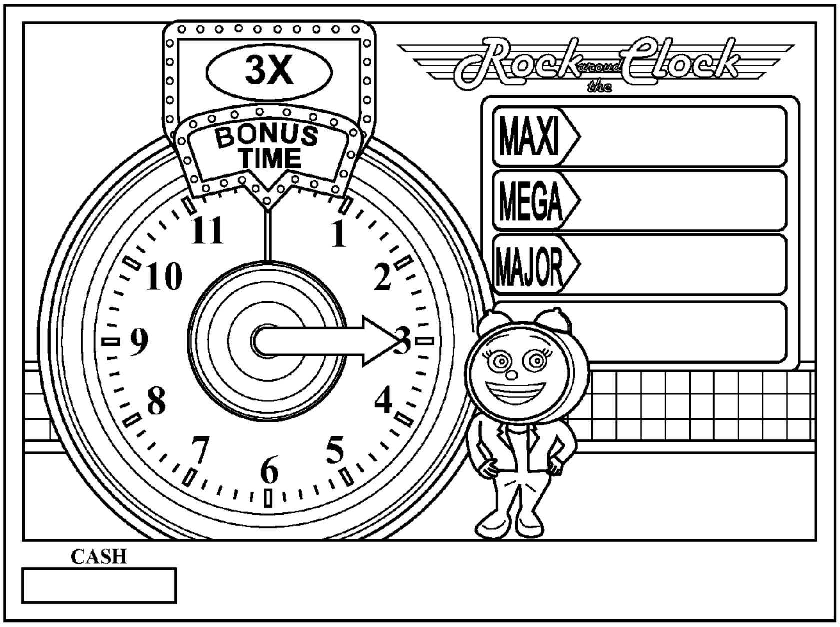
Figure 11B:
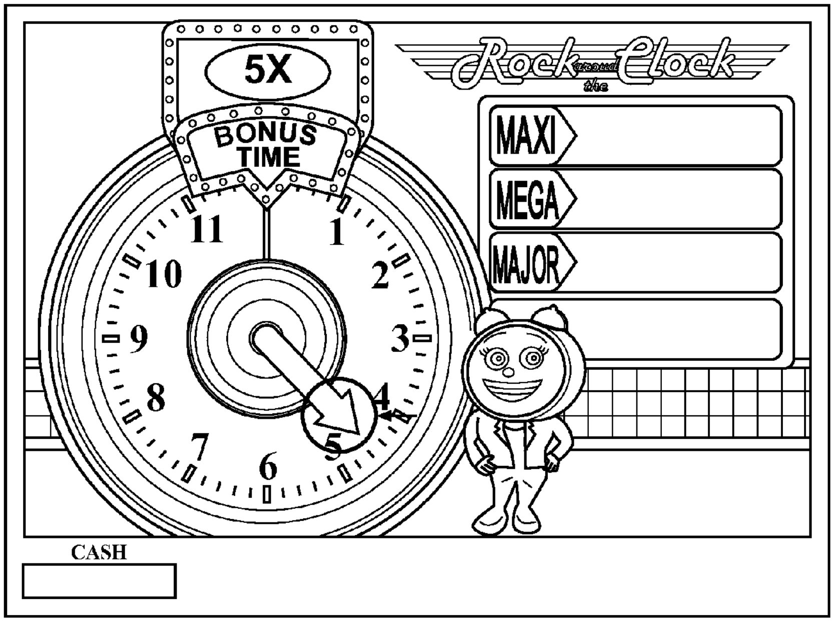

At the completion of a primary game spin, the Mascot may randomly award a bonus boost of time on the clock. This is shown in FIG. 11. Boosts can vary in amount and some could advance the clock all the way to twelve (BONUS TIME).

Figure 12A:
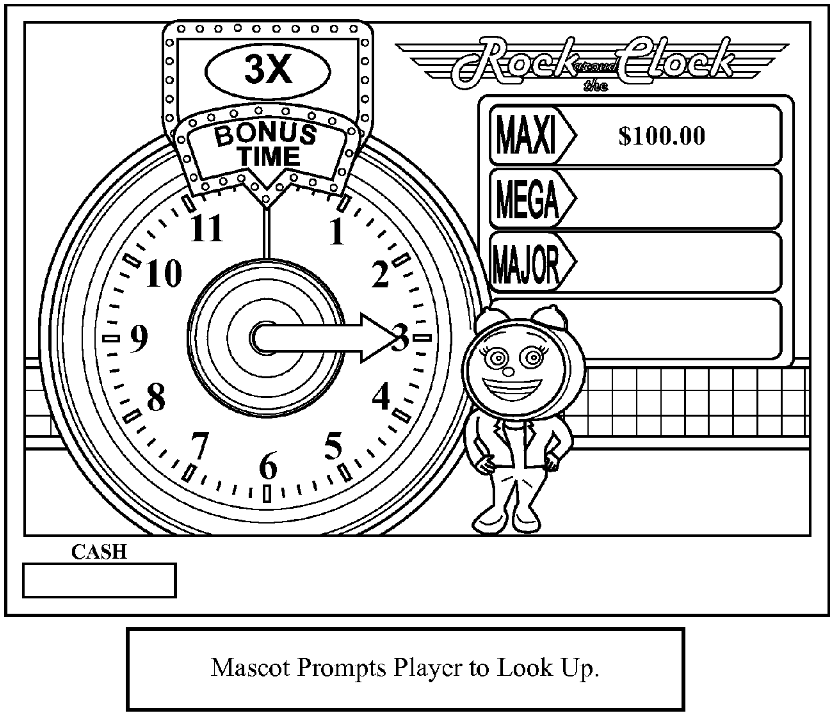
Figure 12B:
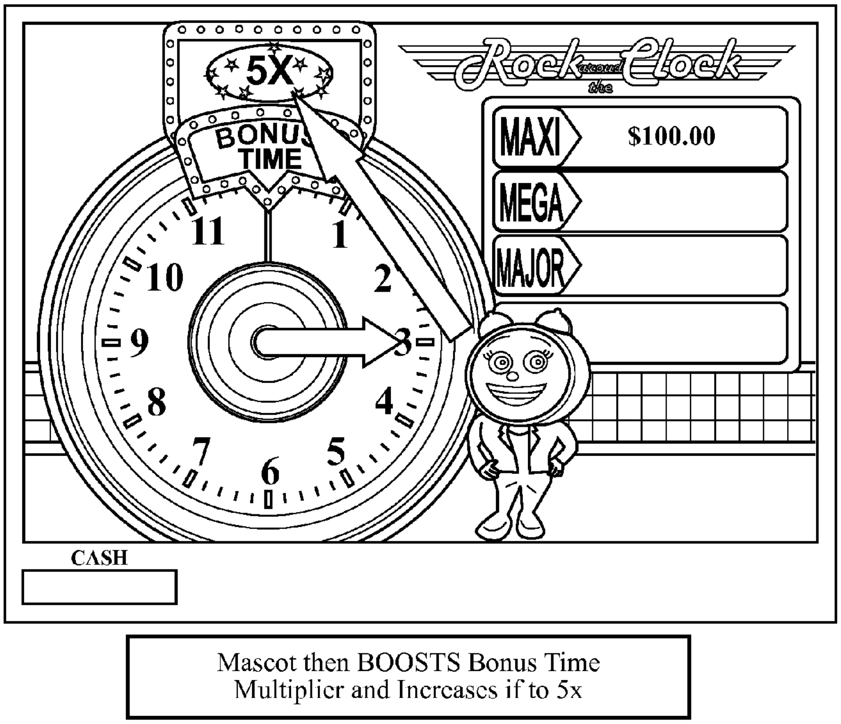

At the completion of a primary game spin, the Mascot may also increase the current BONUS TIME multiplier. If a multiplier and clock boost occur on the same spin, the multiplier boost will occur first, followed by the clock boost. FIG. 12 shows an example.

Figure 13A:
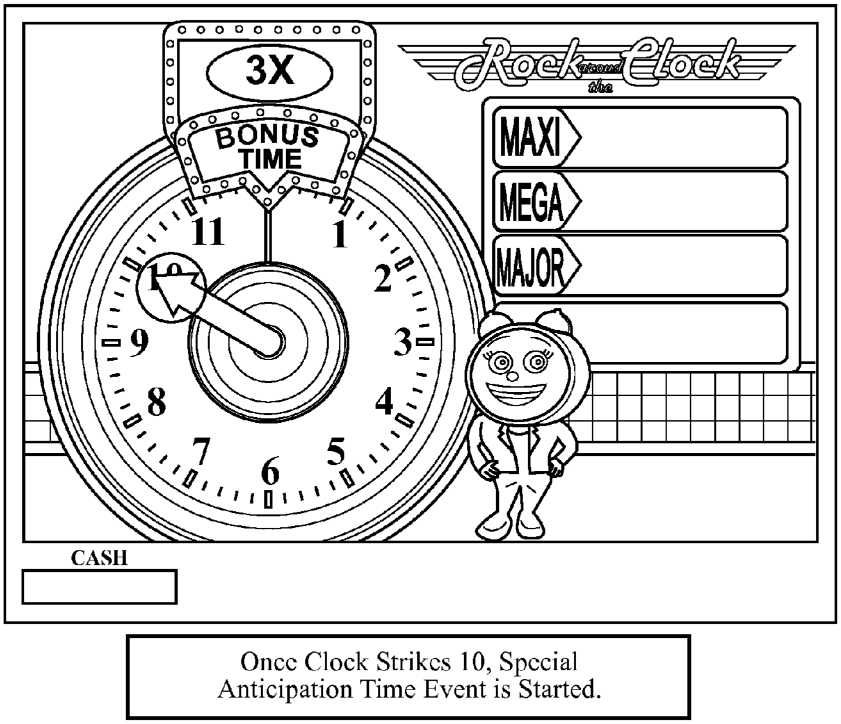

When the clock strikes ten, it enters a special state to add anticipation to the player. The neon around clock flashes and the BONUS TIME and feature game lighting becomes more energetic. The mascot will also point to the clock and an audio cue will be used (FIG. 13). This animation and vocal cue will repeat after every 5 spins. This event will also occur without the vocal cue whenever there are no credits on the machine.

Bonus Game Selection Stage

The bonus game selection will now be described. At the completion of the trigger event, the clock face transforms in a circular shaped 1 reel slot machine (shown in FIGS. 14 and 15). The slot machine contains 6 symbols: one for each of the basic feature games as well as the upgraded versions. The 3 basic bonus game symbols will have a white background. Each upgraded bonus game symbol will have a unique background color that is not white. The reel window area will also be enlarged in order to show a portion of the symbol directly above and below the center symbol (FIG. 14). The BONUS TIME multiplier will remain on the screen.

Figures 15, 18A, 18B:
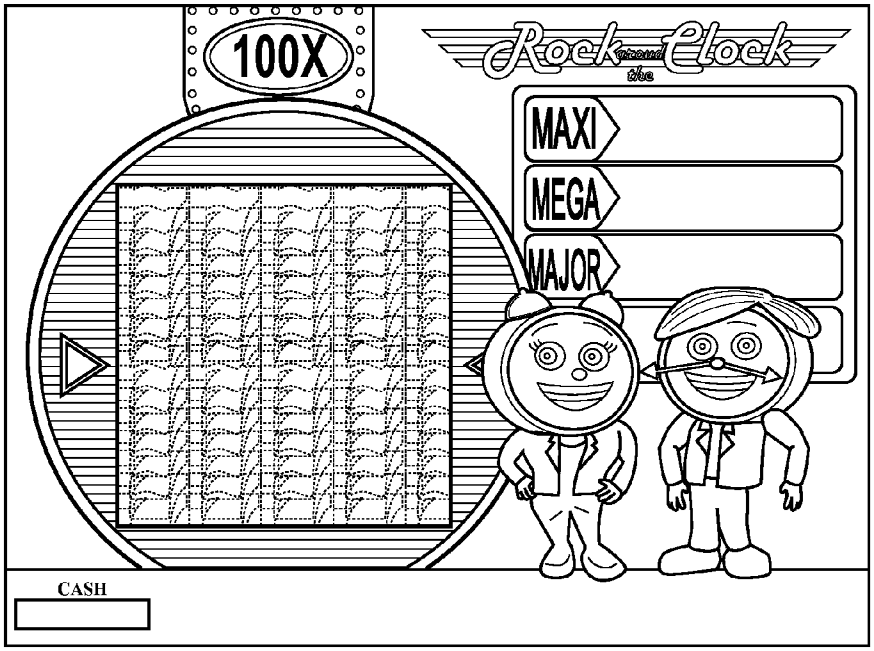

At this point, both Mascots begin to dance while the ROCK AROUND THE CLOCK music is played and the reel begins to spin (FIG. 15). The reel slows down and eventually stops on a final symbol (this entire dance sequence will last about 10 seconds). A vocal cue will be used to announce the feature that has been won and a large feature game banner will be displayed at the reel unit rotates to the correct bonus game. The animations requirements are shown in Table 5. The reel strip layout is shown in Table 6.

On machine reset or after clock reset a trigger game number is selected from a weight table. This number is the bought game that will trigger BONUS TIME. In the original game all game numbers from 1-120 had some chance of being selected. For RAC2 we are going to reduce this set by eliminating the lower values. An example with an average bonus trigger cycle of 100 is shown in Table 7.

In this example, only bought games 50-150 can actually trigger the bonus game.

In one embodiment, the game includes a minimum bet of 25×bet level+25 extra bet=50 credits. Both the Twin LCD and the Light Wheel game were funded by the extra bet and had a fixed payout. This is designed to protect against a betting strategy that would achieve over 100% pay back if the Twin LCD game win was multiplied by bet level. If the player bet low at the beginning and then increased their bet to MAX when the clock was close to hitting BONUS TIME they could get a long term advantage over the machine.

Basic Wagering

Table 8 shows the game options settings.

To encourage higher average bet but still protect against betting strategies, the following system is used. The average bet level is calculated after every spin. An example is shown in Table 9 for 10 spins. The average bet level after these 10 spins is 2.70. If BONUS TIME is triggered on spin #10, the selected bonus feature win will be multiplied by 2.70.

The BONUS TIME multiplier will be displayed on the E-art and updated after every spin. To avoid showing a decimal value, the following equation can be used for every spin except for the first:

OldBetLevel=(Spin Number−1)*AvgBetLevel

TempBetLevel=(OldBetLevel+CurrentBetLevel)/SpinNumber wherein FRACTION(TempBetLevel) represents random chance of increasing TempBetLevel by 1.

If chance is hit then TempBetLevel=INT(TempBetLevel)+1;

Else TempBetLevel=INT(TempBetLevel);

wherein AvgBegLevel=TempBetLevel;

For example if TempBetLevel=2.70, then there is a 70% chance that the value will be increased to 3 and a 30% that it will be decreased to 2. This yields the same long term expectation of 2*0.3+3*0.7=2.70 without having to show decimal values to the player.

However, for the first spin, TempBetLevel will be calculated using the following equation:

TempBetLevel=ResetMultiplier+CurrentBetLevel

It turns out that to protect against betting strategies, the bonus game expected value (EV) has to be multiplied by the following formula:

New Bonus EV=AvgBetLevel*TriggerGameNumber/Average Trigger Game Cycle*Bonus EV

This makes the Bonus Game payout independent of both the wager amount and the trigger game number. To make this work in the actual game, the probabilities of triggering each of the six bonus games will be adjusted for each trigger game number so that the New Bonus EV is scaled by a factor exactly equal to TriggerGameNumber/Average Trigger Game Cycle.

The above system should handle the case where the player changes their bet level. However if the player never or rarely changes their bet level, the BONUS TIME multiplier won't change much or at all and the win potential will be low. To add excitement, the Mascot periodically boosts the multiplier to a higher value. If the player get's lucky and triggers the bonus quickly, then the potential for a large win can be realized. To accomplish this, let's look at an example RPT % break down for the game which is shown in Table 10.

The mascot boost multiplier can be added by reducing the payout for the bonus games as shown in Table 11.

We now have the same Bonus RTP % as before since (1 bet level*20%)+(0.4 bet level*20%)=28%, but have added a mystery multiplier boost to the overall system. A mystery bet level pool will need to be created and updated after every spin according to the following equation if the spin occurs in the last X games (X being the ResetPoolGameNumber used to calculate the reset multiplier):

MysteryBetLevelPool+=CurrentBetLevel−1

Another equation will be used if the spin does not occur in the last X games:

MysteryBetLevelPool+=CurrentBetLevel

The awarding of the MysteryBetLevelPool is controlled by a random trigger. When the trigger occurs, the function GetVolatilityScaleFactor( ) is used to control the volatility of the multiplier awards and would have an expectation of 0.4. An example of this function is shown in Table 12.

This function is applied to the MysteryBetLevelPool at mystery trigger time according to the following equation:

MysteryBetLevelPool=MysteryBetLevelPool*GetVolatilityScaleFactor( )

The game will actually have two trigger cycles and two volatility functions which are based on the bought game number. An example of a second volatility table GetVolatilityScaleFactor2( ) is shown in Table 13. Table 14 shows the trigger cycle and volatility function to use for each bought game number.

The ResetPoolGameNumber is a random number of games that are used to fund the reset multiplier.

The reset multiplier is calculated using the following equation:

TempResetMultiplier=ResetPoolGameNumber*Mascot Boost

FRACTION(TempResetMultiplier) represents random chance of increasing ResetMultiplier by 1.

If chance is hit then ResetMultiplier=INT(TempResetMultiplier)+1;

Else ResetMultiplier=INT(TempResetMultiplier);

The variable Mascot Boost would have a value of 0.4 in this example. The actual value is located in the par sheet. The ResetPoolGameNumber will have a minimum and maximum value such that the ResetMultiplier will have a minimum and maximum value of 1 and 5. With a Mascot Boost of 0.4, the minimum and maximum value of the ResetPoolGameNumber would be 3 and 12 so that the minimum and maximum value of TempResetMultiplier would be 1.2 and 4.8. This would mean the minimum and maximum value of ResetMultiplier would be 1 and 5.

On some triggering condition, the MysteryBetLevelPool will be awarded to the player and the formula from Section 8.7.1 will be modified using the following equation:

TempBetLevel=(OldBetLevel*(SpinNumber−1)+CurrentBetLevel+MysteryBetLevelPool)/SpinNumber MysteryBetLevelPool=0;

When the bonus game is triggered the remaining MysteryBetLevelPool is always awarded.

Figure 16:
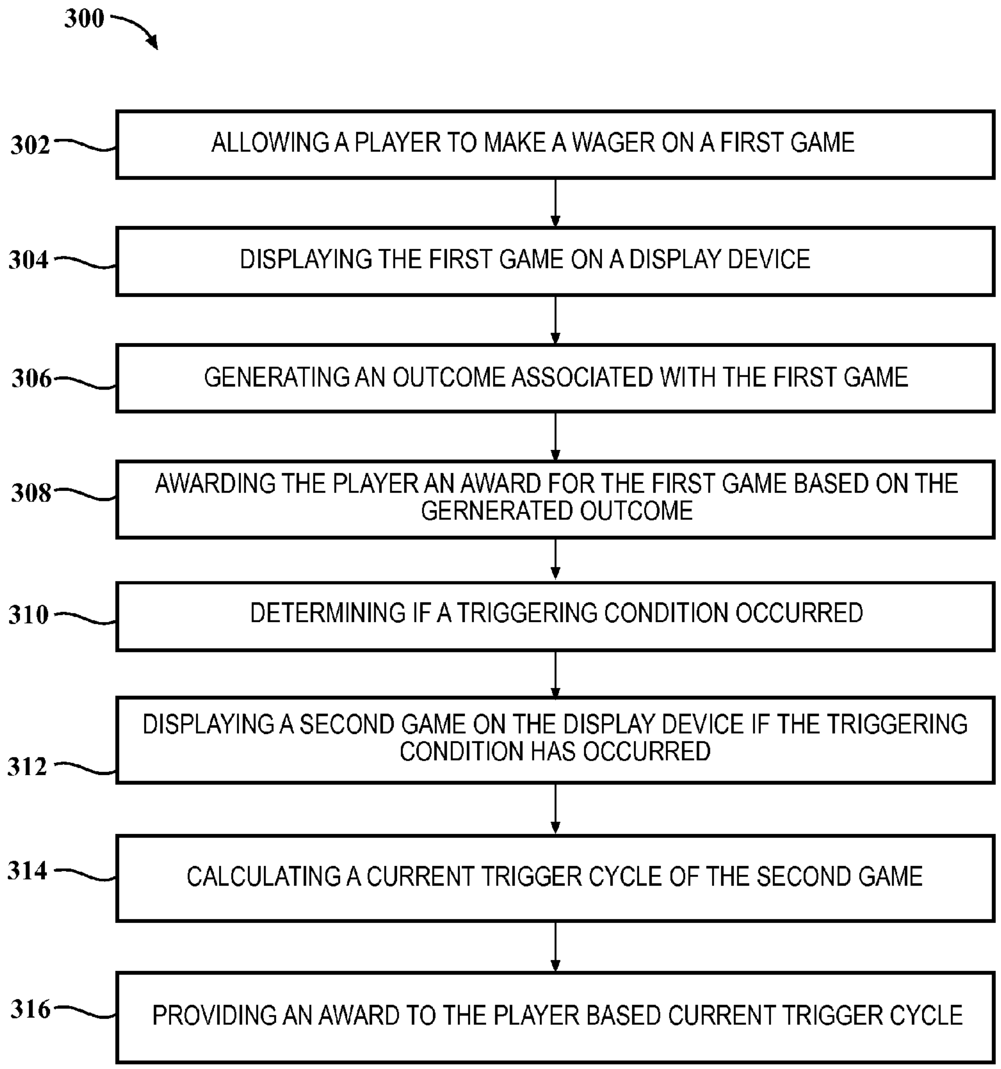
FIG. 16 is a flowchart of an exemplary method of allowing a player to play a gaming machine, according to an embodiment of the present invention; and, FIGS. 17-22 illustrate Tables 1-14.

FIG. 16 is a flowchart of an exemplary method 300 of allowing a player to play a gaming machine 14. The method 300 includes the steps of allowing 302 a player to make a wager on a first game, displaying 304 the first game on a display device, generating 306 an outcome associated with the first game, and awarding 308 the player an award for the first game based at least in part on the generated first game outcome. In addition, the method 300 includes determining 310 if a triggering condition occurred, and displaying 312 a second game on the display device if the triggering condition has occurred. A current trigger cycle of the generated second game is calculated 314, and the player is provided 316 an award for the second game based at least in part on the second game current trigger cycle.

In one embodiment, the method 300 also includes the steps of randomly selecting a trigger event cycle including a number of first games to be played before the occurrence of the second game triggering condition, and determining the triggering condition has occurred if the calculated current trigger cycle is approximately equal to the selected trigger event cycle. In addition, the method 300 includes calculating a scaling factor based at least in part on the current trigger cycle and the average trigger event cycle, and determining the second game award based at least in part on the scaling factor.

In another embodiment, the method 300 includes the steps of calculating an average feature award associated with the calculated trigger event cycle based at least in part on the total average feature award and the scaling factor, determining the second game award based at least in part on the average feature award.

In an alternative embodiment, the method 300 includes the steps of awarding the player a second game award from a plurality of feature awards, and calculating a probability of occurrence associated with each feature award of the plurality of feature awards based at least in part on the calculated average feature award.

Exemplary embodiments of a gaming machine, a gaming system, and a method of allowing a player to play a gaming machine are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A method of allowing a player to play a game with a gaming machine that includes a display device and a processor, the method comprising the steps of:

allowing the player to make a wager;

displaying a first game on the display device;

generating, by the processor, an outcome associated with the first game and displaying the outcome on the display device;

awarding the player a first award for the first game based at least in part on the generated first game outcome;

determining if a triggering condition occurred in the first game and displaying a second game on the display device upon determining the triggering condition has occurred;

calculating a current trigger cycle of the generated second game, the current trigger cycle being equal to a number of first games played after an occurrence of a previous second game triggering condition;

determining an average trigger event cycle associated with the second game;

calculating a scaling factor determined as a function of the current trigger cycle and the average trigger event cycle;

determining a total average feature award associated with the average trigger event cycle;

calculating an average feature award associated with the current trigger cycle based at least in part on the total average feature award and the scaling factor; and awarding the player a second award for the second game, the second award determined as a function of the calculated scaling factor and the average feature award.

2. A method in accordance with claim 1, further comprising the steps of:

randomly selecting a trigger event cycle including a number of first games to be played before the occurrence of the triggering condition; and determining the triggering condition has occurred if the calculated current trigger cycle is equal to the selected trigger event cycle.

3. A method in accordance with claim 2, wherein the trigger event cycle is selected from a predefined range of trigger event cycles.

4. A method in accordance with claim 1, wherein the second award includes a plurality of feature awards, said method further comprises the step of calculating a probability of occurrence associated with each feature award of the plurality of feature awards based at least in part on the calculated average feature award.

5. A method in accordance with claim 1, said method further comprising the step of establishing a current award paytable based at least in part on the calculated average feature award, wherein the second award is also based on the current award paytable.

6. A method in accordance with claim 1, wherein the second game includes a plurality of reels, each reel of the plurality of reels includes a plurality of reel symbols, said method further comprises the step of establishing a symbol weight of each reel symbol of the plurality of reel symbols based at least in part on the calculated average feature award, wherein the second award is also based on the reel symbol weights.

7. A method in accordance with claim 1, further comprising the steps of:

calculating an average wager amount based at least in part on the wager; and calculating the second award based at least in part on the calculated average wager amount.

8. A gaming machine, comprising:

a display device;

a user input device configured to generate a signal indicative of a player's selection input; and a controller coupled to the display device and the user input device, the controller configured to:

display a first game on the display device;

receive, from the user input device, a signal indicative of a player's wager associated with the first game;

generate an outcome associated with the first game and displaying the outcome on the display device;

award the player a first award for the first game based at least in part on the generated first game outcome;

determine if a triggering condition occurred and displaying a second game on the display device upon determining the triggering condition has occurred;

calculate a current trigger cycle of the generated second game, the current trigger cycle being equal to a number of first games played after an occurrence of a previous second game triggering condition;

determine an average trigger event cycle associated with the second game;

calculate a scaling factor as a function of the current trigger cycle and the average trigger event cycle;

determine a total average feature award associated with the average trigger event cycle;

calculate an average feature award associated with the current trigger cycle based at least in part on the total average feature award and the scaling factor; and award the player a second award for the second game, the second award determined as a function of the calculated scaling factor and the calculated average feature award.

9. A gaming machine in accordance with claim 8, wherein said controller is further configured to:

randomly select a trigger event cycle including a number of first games to be played before the occurrence of the triggering condition; and determine the triggering condition has occurred if the calculated current trigger cycle is equal to the selected trigger event cycle.

10. A gaming machine in accordance with claim 9, wherein the trigger event cycle is selected from a predefined range of trigger event cycles.

11. A gaming machine in accordance with claim 8, wherein the controller is further configured to:

award a plurality of feature awards associated with the second game; and calculate a probability of occurrence associated with each feature award of the plurality of feature awards based at least in part on the calculated average feature award.

12. A gaming machine in accordance with claim 8, wherein said controller is further configured to establish a current award paytable based at least in part on the calculated average feature award, wherein the second award is based the current award paytable.

13. A gaming machine in accordance with claim 8, wherein said controller is further configured to:

display the second game including a plurality of reels, wherein each reel of the plurality of reels includes a plurality of reel symbols; and determine a symbol weight of each reel symbol of the plurality of reel symbols based at least in part on the calculated average feature award, wherein the second award is based on the determined reel symbol weights.

14. A gaming machine in accordance with claim 8, wherein said controller is further configured to:

calculate an average wager amount based at least in part on the player's wager; and calculate the second award based at least in part on the average wager amount.

15. A gaming system, comprising:

a plurality of gaming machines, each gaming machine including a user selection input device, a first display device, and a game controller for allowing an associated player to make a wager on a first game, randomly selecting an outcome of the first game, and awarding the associated player a first award based at least in part on the first game outcome; and a jackpot controller coupled to each gaming machine, the jackpot controller configured to:

determine if a triggering condition occurred in a first game played on an associated gaming machine, and generate a second game on the associated gaming machine upon determining the triggering condition has occurred;

calculate a current trigger cycle of the generated second game, the current trigger cycle being equal to a number of first games played on the associated gaming machine after an occurrence of a previous second game triggering condition;

determine an average trigger event cycle associated with the second game;

calculate a scaling factor as a function of the current trigger cycle and the average trigger event cycle;

determine a total average feature award associated with the average trigger event cycle calculate an average feature award based at least in part on the total average feature award and the scaling factor; and award the associated player a second award for the second game, the second award determined as a function of the calculated scaling factor and the calculated average feature award.

16. A gaming machine in accordance with claim 15, wherein said jackpot controller is further configured to:

randomly select a trigger event cycle including a number of first games to be played on the associated gaming machine before the occurrence of the triggering condition; and determine the triggering condition has occurred if the calculated current trigger cycle is equal to the selected trigger event cycle.

17. A gaming machine in accordance with claim 16, wherein the trigger event cycle is selected from a predefined range of trigger event cycles.

18. A gaming machine in accordance with claim 15, wherein the jackpot controller is further configured to:

award a plurality of feature awards associated with the second game; and calculate a probability of occurrence associated with each feature award of the plurality of feature awards based at least in part on the calculated average feature award.

19. A gaming machine in accordance with claim 15, wherein said jackpot controller is further configured to establish a current award paytable based at least in part on the calculated average feature award, wherein the second award is based at least in part on the current award paytable.

20. A gaming machine in accordance with claim 15, wherein said jackpot controller is further configured to:

display the second game including a plurality of reels, wherein each reel of the plurality of reels includes a plurality of reel symbols; and determine a symbol weight of each reel symbol of the plurality of reel symbols based at least in part on the calculated average feature award, wherein the second award is based at least in part on the determined reel symbol weights.

21. A gaming machine in accordance with claim 15, wherein said jackpot controller is further configured to:

calculate an average wager amount based at least in part on the wager received by the associated gaming machine; and calculate the second award based at least in part on the calculated average wager amount.

* * * * *